(12) United States Patent
Okamura et al.

(10) Patent No.: US 6,299,050 B1
(45) Date of Patent: Oct. 9, 2001

(54) FRICTION STIR WELDING APPARATUS AND METHOD

(75) Inventors: Hisanori Okamura, Tokai-mura; Masahiko Sakamoto; Kinya Aota, both of Hitachi; Isao Funyu, Takahagi; Kouichi Watanabe; Akihiro Sato, both of Hitachi; Masakuni Ezumi, Kudamatsu; Yasuo Ishimaru, Tokyo, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/512,472

(22) Filed: Feb. 24, 2000

(51) Int. Cl.[7] .................................................. B23K 20/12
(52) U.S. Cl. ..................... 228/110.1; 228/2.1; 156/73.5
(58) Field of Search ............................... 228/110.1, 112.1, 228/114.5, 119, 234.1, 2.1, 2.3

(56) References Cited

U.S. PATENT DOCUMENTS

| | | | |
|---|---|---|---|
| 4,510,587 | * | 4/1985 | Schneider . |
| 4,721,947 | * | 1/1988 | Brown . |
| 4,855,928 | * | 8/1989 | Yamanaka . |
| 4,971,554 | * | 11/1990 | Moore . |
| 5,460,317 | * | 10/1995 | Thomas et al. . |
| 5,542,600 | * | 8/1996 | Kobayashi et al. . |
| 5,697,544 | * | 12/1997 | Wykes . |
| 5,713,507 | * | 2/1998 | Holt et al. . |
| 5,813,592 | * | 9/1998 | Midling et al. . |
| 6,019,013 | * | 2/2000 | Luik . |
| 6,050,474 | * | 4/2000 | Aota et al. . |
| 6,168,066 | * | 1/2001 | Arbegast . |

FOREIGN PATENT DOCUMENTS

WO-93/10935 * 6/1993 (GB) .
WO-95/26254 * 10/1995 (NO) .

* cited by examiner

Primary Examiner—Tom Dunn
Assistant Examiner—Jonathan Johnson
(74) Attorney, Agent, or Firm—Antonelli, Terry, Stout & Kraus, LLP

(57) ABSTRACT

The invention intends to reduce a frequency at which defects occur in a welding region during friction stir welding, and to improve the reliability of the welding region. The invention resides in a friction stir welding apparatus wherein a distance to the surfaces of the workpieces is detected by a detector, a change of the detected distance is found by a signal processing device, and a tool is rotated by a rotation driving device in a state where a vertical driving device is controlled by a control device so as to suppress the found change, whereby a plastic fluidity of the workpieces is caused to accomplish joining of the workpieces.

12 Claims, 17 Drawing Sheets

FRICTION STIR WELDING APPARATUS AND METHOD

BACKGROUND OF THE INVENTION

1. Field of the Invention

The present invention relates to a friction stir welding apparatus and a method therefor, and in particular, to a friction stir welding apparatus and a method therefor suitable for preventing weld defects such as voids and cracks which occur in weld or joint portions.

2. Related Art

For example, in Japanese Patent No. 2712838 (EPO 6158480B1) and Japanese PCT National Publication No. 508073/1997, there is described a friction stir welding method for performing a welding operation with friction heat generated between a metal rod and pieces to be worked by inserting the metal rod of a material substantially harder than that of the workpieces into the welding region of the workpieces and then moving this metal rod while it is rotated. This friction stir welding method utilizes a plastic fluidity phenomenon due to the friction heat between the metal rod and the workpieces, and it is based on a principle which is different from a method for melting and welding workpieces (e.g., arc welding or the like).

According to examination by the present inventors, a relative positional relation between the metal rod and the workpiece surfaces is important in order to carry out the friction stir welding method described in the above publications. The metal in a plastic fluidity state has to be prevented from overflowing onto the workpiece surfaces from the weld region. That is, if the metal flows out of the weld region, defects often occur in the weld region, which causes the reliability of the weld region to lower.

For the purpose of preventing such defects, it is required that in performing this friction stir welding method, the rotating tool is inserted into the workpieces to a certain depth from their surfaces and this depth is maintained also during the welding.

In general, however, if workpieces have rough surfaces, the height of the workpiece surfaces changes with feeding of the workpieces. In addition, also when the workpieces are heated during the welding, the height of the workpiece surfaces changes sometimes.

In such a case, a relative distance between the tool and the workpieces fluctuates, and the insertion depth of a shoulder portion of the tool which is inserted from the workpiece surfaces also fluctuates.

Further, if the surfaces of workpieces are not flat or if the heights of two workpieces differ from each other, a relative posture between the tool and the workpieces fluctuates on occasion.

SUMMARY OF THE INVENTION

An object of the present invention is to provide a friction stir welding apparatus and a method therefor where joining on rear sides of workpieces is improved and burrs are reduced by controlling a relative positional relation between a tool and the workpieces.

An apparatus according to the invention comprises a tool having a shoulder portion, a tool rotation mechanism for rotating the tool, and a support mechanism for supporting the tool rotation mechanism in a manner that at least one of the posture of a rotation axis along which the tool is rotated and the position of the tool in a direction along the rotation axis is changeable.

In addition, the aforementioned support mechanism makes changeable a relative positional relation between the tool and surfaces to be worked.

An apparatus according to another aspect of the invention further comprises a detecting section for detecting the relative positional relation between the tool and the surfaces of workpieces, and a control section for controlling the support mechanism so that the relative positional relation detected by the detecting section approaches to a predetermined relative positional relation.

An apparatus according to still another aspect of the invention further comprises a control section for controlling the support mechanism so that fluctuation of the relative positional relation detected by the detecting section is minimized.

The invention is further directed to a friction stir welding apparatus by which a tool of a material harder than workpieces fixed on a frame is inserted into a region to be joined of the workpieces, and they are joined by plastic fluidity of the workpieces, wherein the tool has a thread portion to be inserted into the workpieces and a shoulder portion supporting the thread portion and having a diameter larger than the thread portion, and the apparatus has push-in amount adjusting means for setting the thread portion to a desired length so that the thread portion does not contact a surface of the frame and for adjusting a push-in amount of the tool so that the shoulder portion forms a concave of desired depth on the surfaces of the workpieces. A distance between the tip of the tool and the frame is equal to or less than 0.4 mm, preferably from 0.05 to 0.20 mm. Therefore, the length of the thread portion is selected in compliance with the thickness of the joint portion of the workpieces. Further, the depth of the push-in amount is 1 mm or less, preferably from 0.2 to 0.6 mm.

The tool features having angular adjusting means for adjusting an inclination angle so that a leading part of the shoulder portion has a desired gap on the workpiece surfaces in the proceeding direction of welding, and adjusting the push-in amount by a trailing part of the shoulder portion. The inclination angle is within 10 degrees, preferably 3 to 7 degrees, in both directions with respect to a line perpendicular to the workpiece surfaces, and the frame features having grooves, preferably several grooves, for fixing the workpieces to the frame by hold-down members. The grooves are each preferably formed in the shape of a box so that the head of a bolt may engage therewith.

The apparatus features pressing means provided for pressing and restraining workpieces from their lateral sides so that the joint portion of the workpieces may not open.

The invention is accomplished by the apparatus that is equipped with shifting means for the revolution number, the rotation direction, the inclination angle, the vertical movement and the welding line direction of the tool, a control device for them, and hold-down means for the members to be welded, and that is manually or automatically driven. Moreover, the frame which holds workpieces is provided with the box-like grooves as described above, the heads of bolts are engaged in the grooves, and long arms are attached to these bolts, by which arms the workpieces are tightly secured with the aid of screws.

Further, it is preferable to provide a monitor device which can optically and electronically monitor a joining state in the course of welding. The center position of the tool can be adjusted through the monitoring.

The apparatus of the invention is preferably constructed as follows.

(1) The rotational direction of the tool in a forward path and a backward path for welding can be controlled by inverter control. The inclination angle can be adjusted by a driving force from an electric motor via an index shaft.

(2) The insertion depth of the tool from the workpiece surfaces can be adjusted by adjusting the depth of the tool in accordance with the unevenness of the workpieces or the shape of the welding depth. The insertion depth of the tool can be decided by changing the length of a pin from the shoulder. The length of the pin can be adjusted by establishing a set structure where the shoulder and the pin move mutually vertically and the rotations of them are the same.

(3) In the case of a joining state where a part of the surfaces of members to be joined are inclined, the inclination angle of the tool can be adjusted by automatically adjusting the driving means of the tool in accordance with the inclination angle of the workpieces.

(4) In the case that a plurality of joining lines are present on workpieces, a plurality of tools are mounted on the one friction stir welding apparatus and the revolutions, the moving speeds and the inclination angles of the tools are controlled independently or collectively, thereby achieving the joining efficiently.

(5) Workpieces can be restrained by the hold-down means disposed in the coaxial direction with the tool. Moreover, another independent hold-down means can also be provided separately from the first hold-down means.

The insertion depth of the tool from the workpiece surfaces can be adjusted by previously measuring the position of the unevenness from a welding start point on the workpiece surfaces and the change of the unevenness, allowing the control device to recognize the measured results, and then controlling a vertical driving device of the tool on the basis of the recognized signals. That is, a time taken for the tool to reach the position of the unevenness can be calculated from the position of the unevenness from the welding start point and the welding speed, so that a time taken to vertically drive the tool can be decided. Moreover, a difference of height in the uneven region can also be previously measured by a laser displacement gauge or a dial gauge, and the control device is caused to recognize the results. Even in the joining region where the uneven portions are partially present on workpieces, the depth of the tool can be controlled so as to always become constant from the uneven surface through the above technique. In the case that the unevenness is especially serious, the tool can be once pulled out of workpieces, so that the welding is interrupted, and the tool can be then inserted again in consideration of the uneven surface.

In the joining region where a part of the surfaces of workpieces is inclined, the inclination angle of the tool and the start point of inclination can be adjusted by previously measuring the inclination of the workpieces and the inclination angle at the start point, allowing the control device to recognize the results, and then controlling the driving means of the tool on the basis of the recognized signals. Furthermore, the positions of start and end of the inclination can be automatically judged on the basis of a time signal which can be obtained by calculating a distance from the welding start point. In addition, the inclination angle can be adjusted in the course of the welding operation on the basis of a signal which can be obtained by measuring the inclination angle as well as the start point and the end point of the inclination by the use of a laser displacement gauge in the course of the welding operation.

The invention enables joining on a forward path and a backward path in the welding process, and in this case, a plurality of tools, preferably 3 to 5 tools, are installed on one friction stir welding apparatus, and the revolutions, the moving speeds and the inclination angles of the plurality of tools are controlled independently or collectively, whereby the welding work can efficiently be accomplished.

Moreover, automatic adjustment of the tool angle can be achieved by conveying a drive force from an electric motor via a worm gear.

The automatic adjustment can be achieved by applying a pressure from the surface direction or the side direction of workpieces by oil pressure, hydraulic pressure or pneumatic pressure in accordance with the shape of the workpiece.

According to the invention, control can be accomplished so that the insertion depth of the tool from the workpiece surfaces may always become constant in the welding process and so that the insertion angle of the tool with respect to the workpiece surfaces may always become constant.

Accordingly, even in the case of a structure to be welded having a long weld region, occurrence of welding defects can be prevented, so that it is possible to make the welded structure with a high reliability.

According to the invention, for example, a weld structure which is made of an aluminum-based alloy plate and has a weld length as long as 20 m, more concretely, a railway car, especially a high speed railway car can be manufactured, preventing weld defects from occurring. Moreover, it is similarly possible to join an automobile body made of the aluminum-based alloy plate, and after the joining, finishing is done to a desired shape. After cutting, press working is performed to a desired shape.

Moreover, according to the invention, the rotation, the inclination, the vertical movement and the joining line direction movement of the tool in the course of welding can be optionally adjusted, and so the excellent joining of rear surfaces and the joining with less burrs on front surfaces can be accomplished. Further, because workpieces can efficiently and stably be held, stable joining can be accomplished even in the case of long workpieces, inclined workpieces or uneven workpieces.

DETAILED DESCRIPTION OF THE PREFERRED EMBODIMENTS

[Embodiment 1]

Figure 1:
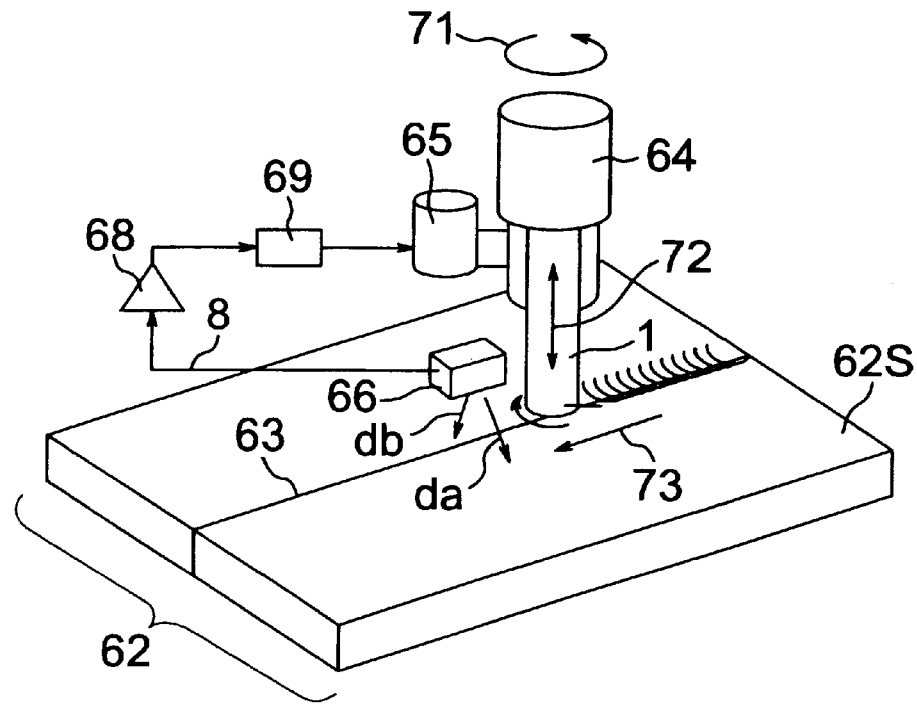
FIG. 1 is a perspective view showing a friction stir welding apparatus according to the present invention.

A friction stir welding apparatus in FIG. 1 is comprised of a tool 1 for causing friction with workpieces 62, a rotation driving device 64 for rotating the tool 1, a vertical driving device 65 for moving the tool 1 along the direction of its rotation axis, a detector 66 for detecting a distance to a surface 62S of the workpieces 62, a signal processing device 68 for finding a change of the detected distance, and a control device 69 for controlling the vertical driving device 65 so as to suppress the found change.

The above tool 1 is made of a material substantially harder than that of the workpieces (members to be welded). As such a material of the tool 1, a metal can typically be used. Ceramics, surface-hardened members and the like may also be used, so long as they satisfy requirements such as tenacity and heat resistance in addition to the hardness.

The rotation driving device 64 and the vertical driving device 65 are mounted on a movable frame (not shown) for moving relatively to the workpieces 62 in a weld line direction 73.

The detector 66 is disposed at a predetermined height with respect to the end face of the tool 1 and in front of the tool 1 in the weld line direction 73, and it moves in the same direction as the tool 1 and together with the tool 1.

Figure 2:
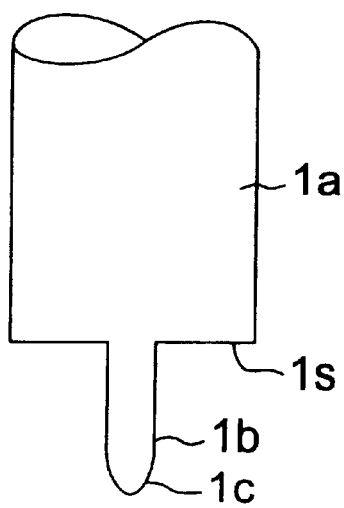
FIG. 2 is a cross sectional view showing the cross sectional shape of a tool.

In FIG. 2, the tool 1 is formed in a shape having a base 1a and a threaded tip portion 1b attached to a shoulder portion 1S which is an end face of the base 1a. Preferably, the base 1a and the tip portion 1b are formed into a rotation symmetry shape having a common axis. More specifically, the base 1a is formed into a cylindrical shape, and the tip portion 1b is formed in a shape tapering toward its tip 1c.

The base 1a and the tip portion 1b may be formed integrally from a common member, or may also be of a structure combining the base 1a and the tip portion 1b which are separately formed.

The operation of butt welding in this embodiment will be described below.

First, when starting welding, a distance (d0) to the surface 62S of the workpieces 62 before the start of welding is detected by the detector 66. Then, the thus detected distance (d0) is stored in the above signal-processing device 68.

Then, the tool 1 is inserted into a welding groove 63, and the tool 1 and the workpieces 62 are relatively moved in the weld line direction 73 while the tool 1 is rotated to perform a welding process. In this state, the information regarding the distance (d) to the surface 62S of the workpieces in the welding process which is detected by the detector 66 is sent to the signal processing device 68. In this signal processing device 68, the stored distance (d0) before the start of welding is compared with the distance (d) in the welding process, and at least a comparative relation between these distances is sent to the control device 69.

The control device 69 gives, to the vertical driving device 65, a command for driving the tool 1 in the vertical direction 72 so that the distance (d0) before the start of welding may be equal to a height (d) in the welding process on the basis of the above comparative relation. That is, when the distance in the welding process is larger than that before the start of welding, the control device 69 gives a command for driving the tool 1 upward as much as a predetermined distance. Alternatively, if the height in the welding process is smaller than that before the start of welding, the control device gives a command for driving the tool 1 downward as much as a predetermined distance. Moreover, if the height in the welding process is equal to the distance before the start of welding, the control device gives a command for fixing the tool 1.

The predetermined distance regarding the driving command is decided from a time interval at which the control is conducted, a drive speed of the vertical driving device 65 and an expected velocity of change in the height of the surface 62S of the workpieces 62. This height change speed of the surface 62S of the workpieces 62 is obtained from a change rate of the height of the surface 62S in the weld line direction 73 and a speed at which the tool 1 and the workpieces 62 are relatively moved in the weld line direction 73.

In this way, the distance in the welding process between the surface 62S of the workpieces 62 and the detector 66 is controlled so as to be equal to the distance before the start of welding. The detector 66 moves together with the tool 1 as described above, and hence the depth of the tool 1 to be inserted into the workpieces 62 (the depth from the surface 62S to the end face) can be controlled constant.

Although the example of control on the basis of the comparative relation has been described, a difference between the distance to the surface 62S of the workpieces during the welding process and that before the start of welding may be calculated, and the tool 1 may be vertically driven as much as the distance based on the above difference. More specifically, a difference (d–d0) between the distance (d) in the welding process and the distance (d0) before the start of welding is calculated in the signal processing device 68, and in the above control device 69, a command for driving the tool 1 downward by the distance based on the thus calculated difference (d−d0) is given to the vertical driving device 65. In this connection, a relation between the above difference and the distance of the driving command can be determined in consideration of, for example, the speed and the stability of convergence in a feedback control.

Figure 3:
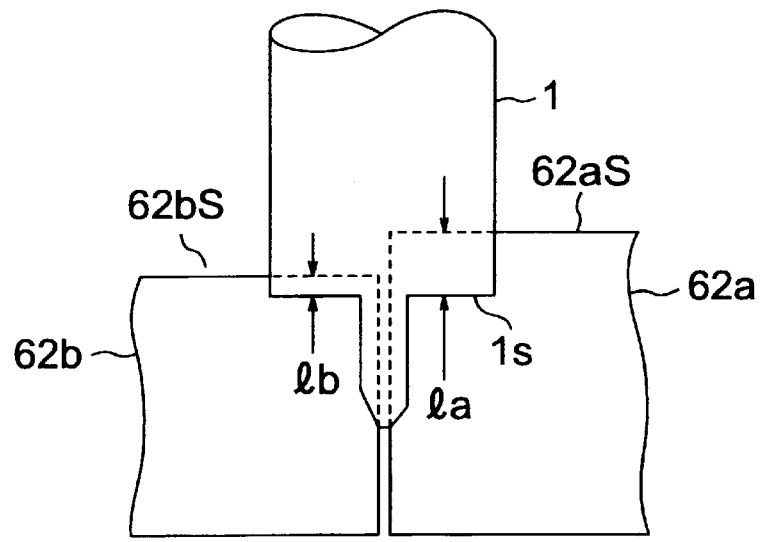
FIG. 3 is a cross sectional view showing a relation between two workpieces having different heights and the tool inserted into a welding bevel portion.

FIG. 3 is a cross sectional view explaining a preferable operation in the case that the heights of two workpieces differ from each other and the distances from the detector to surfaces of the workpieces 2 differ from each other.

In the case that the two workpieces 62a, 62b differ from each other in height as shown in FIG. 3, depths 1a, 1b of the end face 1S of the tool 1 which is inserted from the surfaces 62aS, 62bS of the workpieces 62a, 62b differ from one other. Therefore, even if the tool 1 is inserted into the higher workpiece 62a to a predetermined depth (e.g., 0.1 to 0.5 mm), the depth of the tool inserted into the other workpiece 62b is smaller than the predetermined depth. In consequence, the metal in a plastic fluidity state can not sufficiently be enclosed, so that the metal overflows on occasion from a region where the surface 62bS of the lower workpiece 62b comes in contact with the tool 1.

In the friction stir welding apparatus to which the invention has been applied, in such a case as above, a distance (da) to one workpiece 62a and a distance (db) to the other workpiece 62b are detected at the start of welding by the detector 66. Then, the insertion depth of the tool 1 is controlled on the basis of a larger one of both the distances.

More specifically, for example, the distances (da0, db0) before the start of welding are detected by the above detector 66, and the information of a larger distance is stored in the signal processing device 68 (hereafter, the stored distance is designated as d0). In the signal processing device 68, a larger one of the distances (da, db) to the two workpieces 62a, 62b detected by the detector 66 in the welding process is compared with the stored distance (d0) before the start of welding. The control using the result of this comparison can be conducted similarly to the case of controlling without distinguishing the heights of the above-mentioned respective surfaces.

Alternatively, a difference between the distance to the workpieces 62aS, 62bS before the start of welding and those in the course of welding may be calculated, and the tool 1 may be vertically driven as much as a distance corresponding to the above difference. In this case, a difference between a larger one of the distances (da, db) in the course of welding of the two workpieces 62a, 62b and the distance (d0) before the start of welding is calculated by the signal processing device 68. Then, a command for driving the tool 1 in accordance with the obtained difference is given to the vertical driving device 5. Furthermore, a relation between the above difference and the distance based on the driving command can be determined similarly to the above-mentioned case, for example, in consideration of the speed and the stability of convergence in the feedback control.

In this way, even if the heights of the two workpieces 62a, 62b differ from each other, the depth of the tool 1 to be inserted into the workpieces 62a, 62b (the depth from the surface 62S to the end face) can be controlled constant on the basis of the lower surface 62bS. That is, in starting welding, a smaller one 11 of depths for which the tools are inserted into the two workpieces 62a, 62b can be controlled to a predetermined depth, and welding is then performed. Therefore, the metal in the plastic fluidity state can be prevented from overflowing from the end face 1S of the tool 1.

[Embodiment 2]

Figure 4:
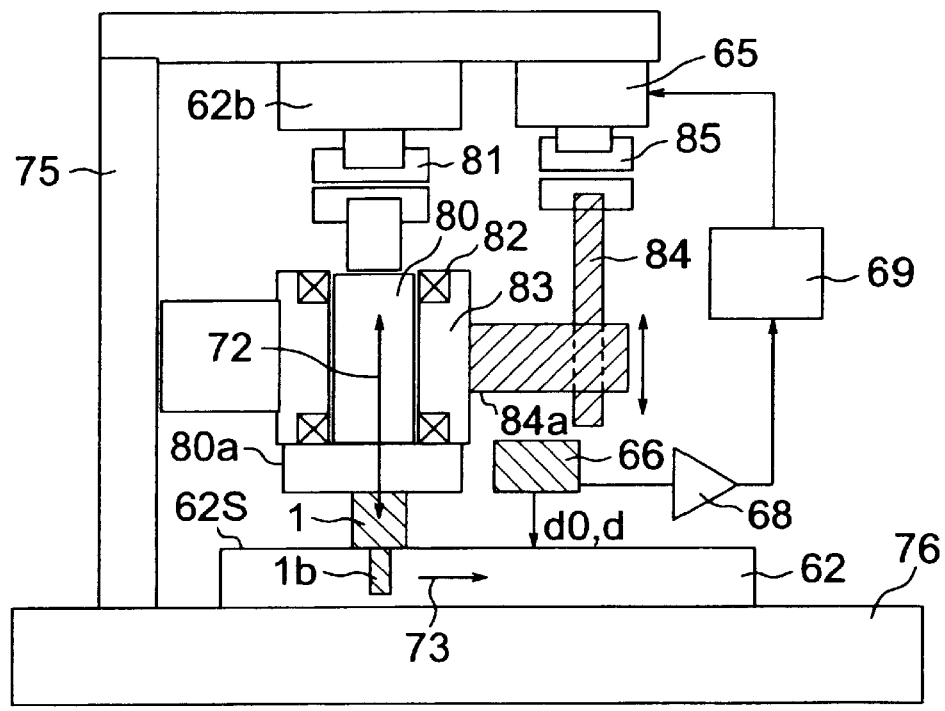
FIG. 4 is a cross sectional view showing another friction stir welding apparatus according to the invention.

FIG. 4 is a cross sectional view of an apparatus comprising a motor as a drive source and a laser displacement gauge as a detector.

In FIG. 4, the friction stir welding apparatus comprises a tool 1 for casing friction with the workpieces 2, a rotating shaft 80 provided with an attaching member 80a for attaching the tool 1, a box 83 where a rotation bearing 82 for rotatably supporting the rotating shaft 80 is installed, a coupling 81 for absorbing an end play of the rotating shaft 80, a rotation motor 4 for rotating the rotating shaft 80, a drive shaft 84 for moving the box 83 along the axial direction of rotating shaft 80, a coupling 85 for absorbing the end play of the drive shaft 84, a vertical drive motor 65 for rotating the drive shaft 84, a detector 66 for detecting a distance to a surface 62S of workpieces 62, a signal processing device 68 for finding a change of the detected distance, a control device 69 for controlling the drive motor 65 so as to suppress the obtained fluctuation, a movable frame 75 for supporting the rotation motor 64 and the vertical drive motor 65, and a welding frame 76 for fixing and supporting the workpieces 62 and for movably supporting the movable frame 75 in a weld line direction 73.

The tool 1 is connected to the rotation motor 64 via the rotating shaft 80 and the coupling 81. Further, the rotating shaft 80 is accommodated in the box 83 via the rotation bearing 82.

The above box 83 is also connected to the drive shaft 84 for driving it in the vertical direction. The drive shaft 84 is connected to the drive motor 65 for driving the tool 1 in the vertical direction through the coupling 85.

The rotation motor 64 and the vertical drive motor 65 are mounted on the movable frame 75.

The movable frame 75 is mounted on the welding frame 76, and moves in the weld line direction 73 on the welding frame 76.

The detector 66 is for detecting a change in height of the surface 62S of the workpieces. The detector 66 is attached to a front portion of the tool 1 in the weld line direction 73. In the arrangement of this embodiment, a laser displacement gauge is used as the detector 66, and this is arranged at a position distanced forward by 30 mm from the tool 1 in the weld line direction 73.

The tool 1 is driven in the vertical direction in the following sequence in accordance with a difference between the height of the surface 62S of the workpieces just before welding and in the course of welding.

(Step 1) The tool 1 is inserted into the workpieces 62 from their surfaces to a predetermined depth. At the point of time when the tool has been inserted to the predetermined depth, namely, just before the start of welding, a distance d0 from the detector 66 to the surface 62S of the workpieces is detected by the detector 66. This distance d0 becomes the base of an adequate depth of the tool 1 where good welding can be done. Therefore, this distance d0 is regarded as a reference signal for comparing a difference from the distance in the course of welding. If distances to the two workpieces are different from each other, the reference signal representing a larger distance of them is generated.

(Step 2) Then, a distance d to the workpiece surface 62S in the course of welding is detected continuously or periodically.

(Step 3) The detection signal d0 of the distance detected in the step 1 and the detection signal representing the distance d detected in the step 2 are input into the signal processing device 68. Then, in the signal processing device 68, the distance d0 is compared with the distance d to obtain a difference therebetween, namely, a difference between the height of the workpieces 62 just before the start of welding and that in the course of welding. And, a comparison signal expressing this difference is generated.

(Step 4) The comparison signal generated in the step 3 is input into the control device 69. The control device 69 controls the vertical drive motor 65 so as to drive the tool 1 in vertical direction in accordance with the input signal.

If the distance d detected in the step 2 is equal to the distance d0 detected in the step 1 (the difference of the distance is zero), this fact means a phenomenon where the height of the surface 62S of the workpieces is the same as just before the start of welding and it does not change. Accordingly, there is no need for driving the tool 1 in the vertical direction. Therefore, the vertical drive motor 65 does not drive, and the position of the tool 1 is constant.

On the other hand, if the distance d detected in the step 2 is smaller than the distance d0 detected in the above step 1 (the difference of the distance is minus), this fact means a phenomenon where the surface 62S of the workpieces is higher than just before the start of welding. Accordingly, it is necessary to raise the tool 1 as much as the distance of a difference ($\Delta X$) obtained in the step 3 by the vertical drive motor 65.

Furthermore, if the distance d detected in the step 2 is larger than the distance d0 detected in the step 1 (the difference of the distance is plus), this fact means a phenomenon where the surface 62S of the workpieces is lower than just before the start of welding. Accordingly, it is necessary to lower the tool 1 as much as the distance of a difference ($\Delta Y$) obtained in the step 3 by the vertical drive motor 65.

As described above, control is made in accordance with the signal of change in the height of the surface 62S of the workpieces 62 so that an insertion depth of the tool 1 from the surface 62S of the workpieces may be always constant in the course of welding.

Therefore, even in the case that a weld length is as long as 20 m, a welded structure which is free from weld defects can be obtained.

Examples of such a welded structure include car structures for railway. Especially, in the case of high-speed railway cars, they tend to be long, and with this tendency, weld lengths become long as well.

[Embodiment 3]

Figure 5:
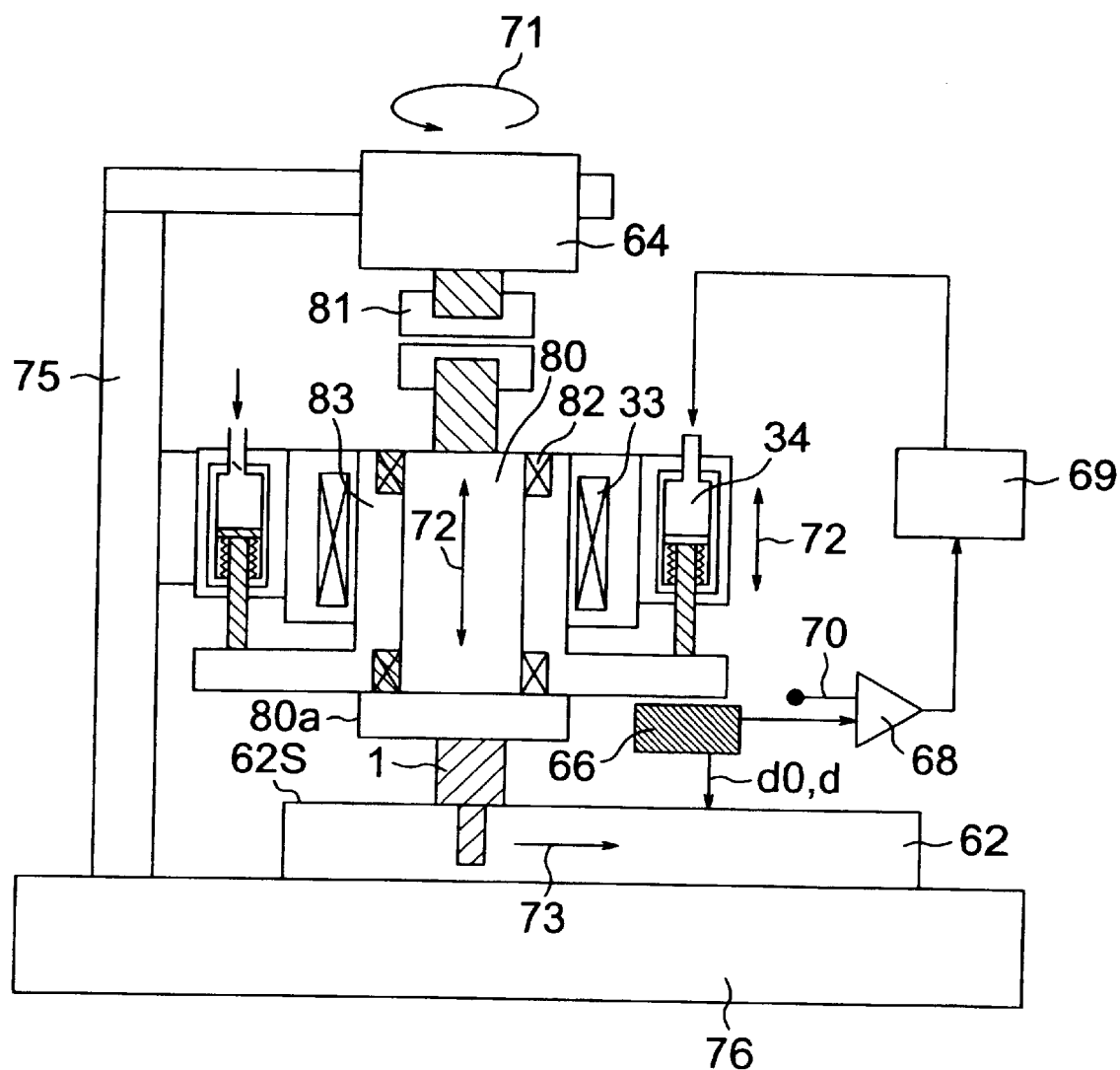
FIG. 5 is a cross sectional view showing still another friction stir welding apparatus according to the invention.

FIG. 5 is a cross sectional view of an apparatus comprising a hydraulic device as a drive source in the vertical direction and a contact type differential transformer as a detector.

In FIG. 5, the friction stir welding apparatus comprises a tool 1 for causing friction with workpieces 2, a rotating shaft 80 provided with an attaching member 80a for attaching the tool 1, a box 83 where a rotation bearing 82 for rotatably supporting the rotating shaft 80 is installed, a coupling 81 for absorbing an end play of the rotating shaft 80, a rotation motor 4 for rotating the rotating shaft 80, a hydraulic driving device 34 for driving the box 83 along the axial direction of the rotating shaft 80, a bearing 33 in the vertical direction for supporting the box 83 movably in the vertical direction with respect to the hydraulic driving device 34, a detector 6 for detecting a distance to the surface 62S of workpieces 62, a signal processing device 68 for finding a change of the detected distance, a control device 69 for controlling the hydraulic driving device 34 so as to suppress the found change, a movable frame 75 for supporting the rotation motor 64 and the hydraulic driving device 34, and a welding frame 76 for fixing and supporting the workpieces 62 and for movably supporting the movable frame 15 in a weld line direction 73.

The tool 1 is connected to the rotation motor 64 via the rotating shaft 80 and the coupling 81.

The rotating shaft 80 is supported on the box 83 via the rotation bearing 82.

The box 83 is connected to the hydraulic driving device 34 via the bearing 33 in the vertical direction. Moreover, the hydraulic driving device 34 and the rotation motor 4 are connected to the movable frame 75 which moves in the weld line direction 73. With this structure, the hydraulic driving device and the rotation motor can be moved in the weld line direction 73 while the tool 1 is rotated and in a state where the distance to the surface of the workpieces is controlled to be constant.

The detector 66 is for detecting changed in the height of the surface 62S of the workpieces. The detector 66 is attached to a front portion of the tool 1 in the weld line direction 73. In the arrangement of this embodiment, a contact type differential transformer is used as the detector 66, and this is arranged at a position distanced forward by 30 mm from the tool 1 in the weld line direction 73.

The drive of the tool 1 in the vertical direction which is done in accordance with a difference between the height of the surface 62S of the workpieces just before welding and that in the course of welding is the same as in Embodiment 1. That is, a distance d0 from the surface 62S of the workpieces which is detected just before the start of welding is compared by the signal processing device 68 with a distance d from the surface 62S of the workpieces which is detected in the course of welding, and this signal is input into the control device 9 to drive and control the hydraulic driving device 34. A predetermined signal 70 may be previously input into the signal processing device 68, and this signal 70 may be compared with a signal indicating the height (the distance d) in the course of welding to thereby vertically drive and control the tool 1.

Furthermore, if the heights of surfaces of two workpieces to be butt-welded are approximately equal to each other, there is especially no problem, but if the heights are different from each other, the insertion depth of the tool 1 is controlled on the basis of a lower surface height of both the workpieces.

According to the friction stir welding apparatus, an insertion depth of the tool 1 from the surface of the workpieces is controlled to be always constant in the course of welding in accordance with changes in the surface height of the workpieces 62.

Therefore, even if the weld length is as long as 20 m, a welded structure which are free from weld defects can be obtained.

[Embodiment 4]

Figure 6:
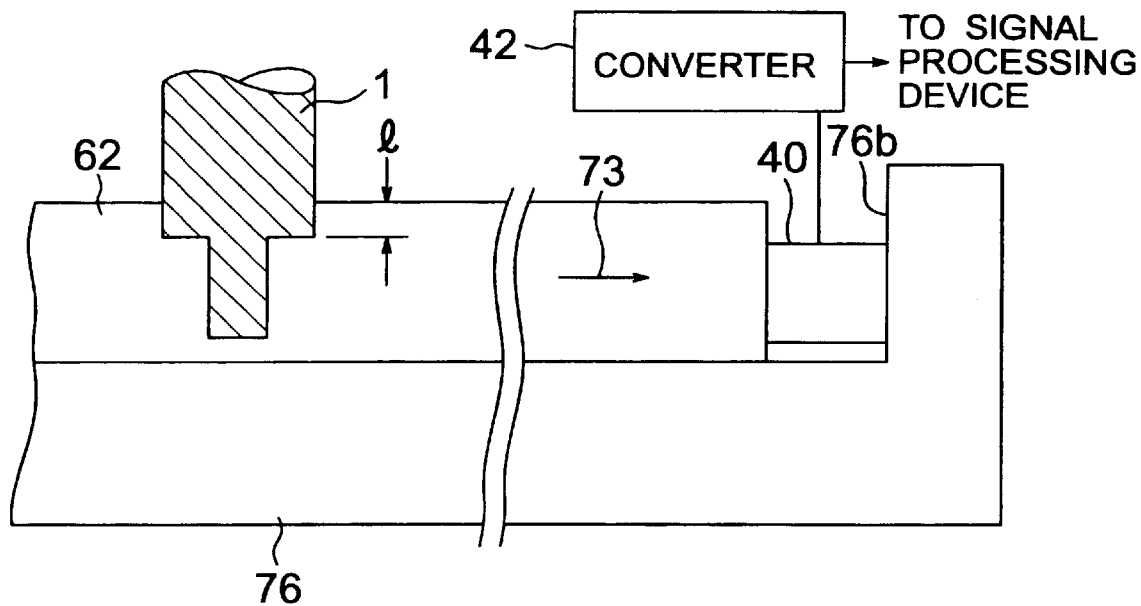
FIG. 6 is a cross sectional view showing a welding frame and a load detecting section according to the invention.

FIG. 6 is a cross sectional view of an apparatus which has a welding frame and a load detecting section and which detects an insertion depth of a tool through a load on the tool in the weld line direction.

In FIG. 6, the weld frame 76 is provided with an engaging protrusion 76b for engaging workpieces 62 in the weld line direction. The load detecting section 56 is attached to the engaging protrusion 76b. The load detected by the load detecting section 56 is sent to a signal processing device 68 (FIG. 1) via a converter 58.

The load detecting section 56 detects a load which is applied to workpieces 62 in the weld line direction. The load detecting section 56 can be formed, for example, using a pressure sensor.

The converter 58 is for converting the load in the weld line direction detected by the load detecting section 56 into the insertion depth of the tool. The converter 58 can be structured using, for example, an arithmetic circuit or a mapper circuit equipped with a mapping table.

Figure 7:
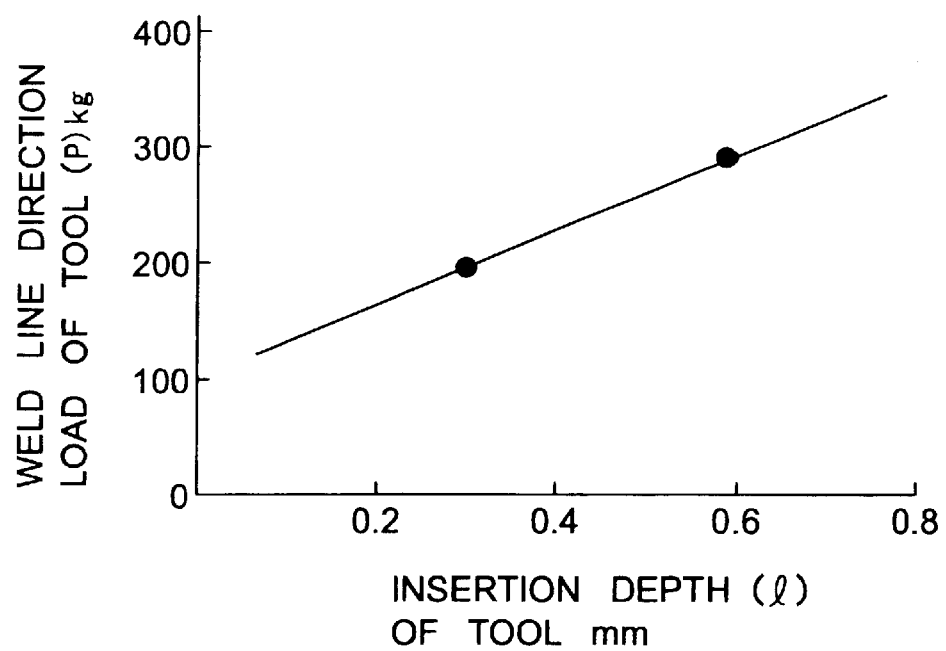
FIG. 7 is a diagram showing a relation between a load on a tool in a weld line direction and an insertion depth of the tool.

FIG. 7 is a diagram showing the relation between the load on the tool in the weld line direction and the insertion depth of the tool. The axis of abscissa takes the insertion depth (1) mm where the end face of a tool shoulder portion is inserted from the surface of the workpieces, while the axis of ordinate takes the load (P) kg to which the tool is subjected in the weld line direction. The load to which the tool is subjected in the weld line direction corresponds to the reaction force acting on the tool involved in feeding of the tool (the relative movement in the weld line direction between the tool and the workpieces).

As shown in FIG. 7, the load (reaction force P) to which the tool is subjected in the weld line direction increases approximately proportional to the insertion depth (1) of the tool into the workpieces.

Therefore, by detecting the load (P) in the weld line direction of the tool, the vertical depth or insertion depth of the tool into the weld members can be controlled on the basis of this detected signal.

The load (P) in the weld line direction of the tool is detected using an output from the load detecting section by engaging the workpieces via the load detecting section to the weld line direction (the welding progress direction) when securing the workpieces.

The converter 58 can be formed by using an arithmetic circuit conducting calculation for converting the load (P) into the insertion depth (1), or using a mapper circuit equipped with a mapping table in which, concerning expected loads, insertion depths (1) corresponding to the loads (P) have been mapped.

The insertion depth in the course of welding can be controlled by sending the insertion depth (1) obtained from the load (P), that has been detected by the load detecting section, into the signal processing device 68 (FIG. 1) and by giving it as the insertion depth in the course of welding. The control can be done similarly to Embodiment 1 through Embodiment 3, so its detailed explanation will be omitted.

On the other hand, as described in Embodiment 3, in case of previously inputting the pre-designated signal 70 (see FIG. 5) into the signal processing device 68 (see FIG. 5), it may also permitted to previously input the signal indicating a predetermined load (PO) before the start of welding, and to input the signal indicating the load (P) detected by the load detecting section into the signal processing device 68 (see FIG. 5) in the course of welding. Thereby, the load P on the tool in the weld line direction in the course of welding can be controlled to become the predetermined load (PO). Therefore, the insertion depth 1 of the tool can be controlled to become the predetermined depth in the course of welding. When this kind of control is done, the converter may be omitted, and the structure can be simplified.

For instance, if the insertion depth (1) is to be 0.1 to 0.5 mm, the tool may be driven and controlled in the vertical direction so that the load (P) being detected by the load detecting section becomes 130 to 260 kg.

[Embodiment 5]

Figure 8:
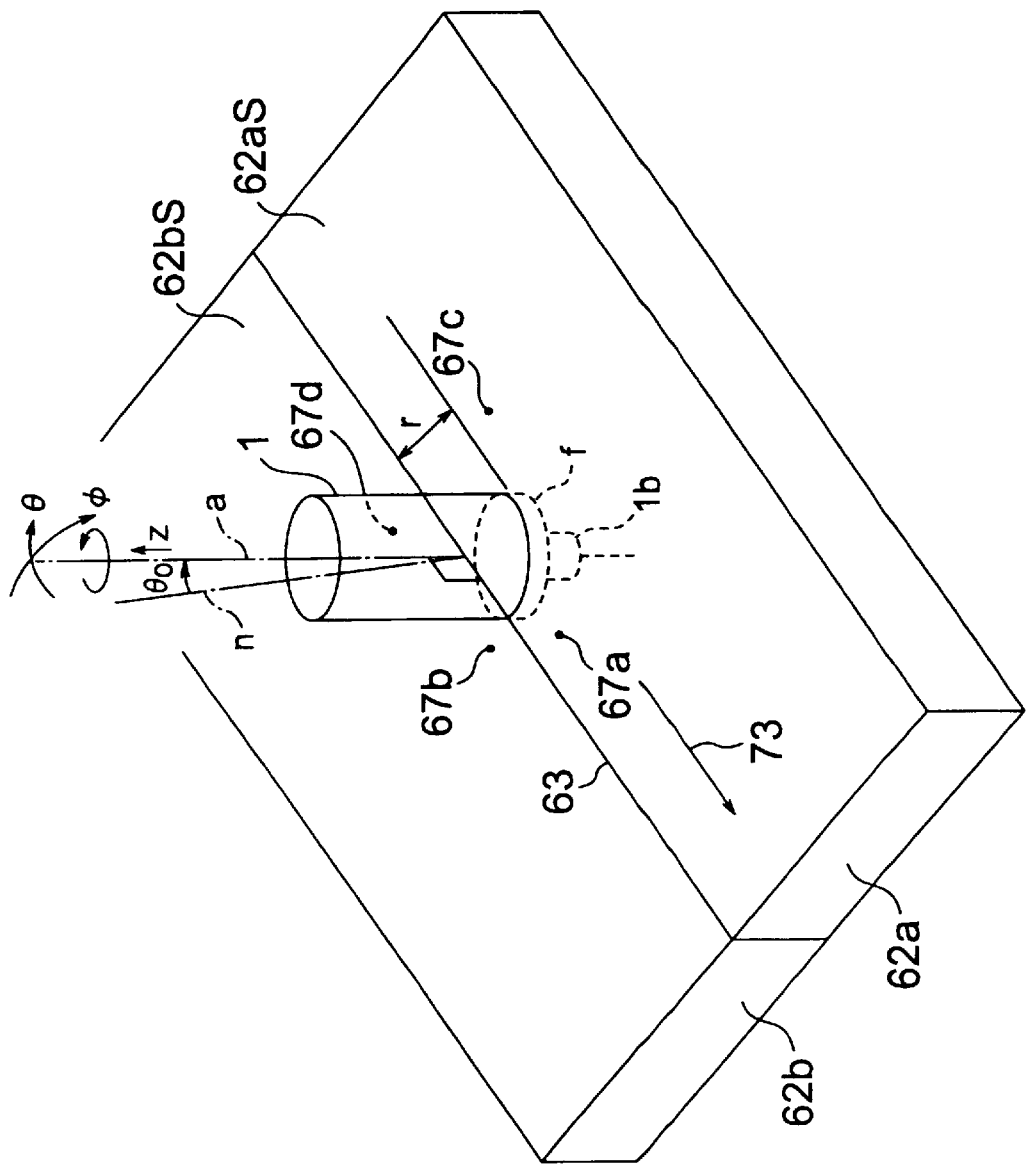
FIG. 8 is a perspective view showing a relative positional relation between workpieces and a tool of the invention.

FIG. 8 is a block diagram for conducting friction stir welding of workpieces while controlling a depth for which the end face of a tool is inserted into the workpieces and also the relative posture between a rotation axis about which the tool is turned and the surface of the workpieces.

In FIG. 8, the tool 1 turning around the rotation axis a is inserted into a welding groove 3 where the two workpieces 62a, 62b are butted to each other.

First, description will be made of the case where the surfaces 2aS, 2bS of the two workpieces 62a, 62b are both flat and their heights are equal to each other. In this case, the tool 1 is to be inserted into a plane (hereinunder referred to as plane S) containing both the surfaces 62aS, 62bS.

In this case, the relative posture between the tool 1 and the workpieces 62a, 62b may be controlled such that a normal line n of the plane S coincides with the rotation axis a. For example, the posture of the tool 1 can be fixed and supported in the state that, by changing inclination of the rotation axis a around the cross point between the rotation axis a of the tool 1 and the welding groove 63 in the plane S, the normal line n coincides with the rotation axis a.

Further, the depth for which the end face of the tool 1 is inserted into the workpieces 62a, 62b (insertion depth) may be controlled such that the periphery f of the end face of the tool 1 is inserted by a predetermined depth from the plane S. In this case, because the end face of the tool 1 is parallel with the plane S, the control can be done on the basis of the distance (depth) to the plane S at an arbitrary point of the periphery f.

The rotation axis a may also be inclined backward by a predetermined angle θ0 (hereinafter referred to as backward inclined angle) in the weld line direction 13 with respect to the normal line n within the plane including the weld line direction 73 and the normal line n. An effect of preventing the metal in a plastic fluidity state from overflowing can be enhanced more by supporting the tool 1 with the backward inclined angle provided in this way. This backward inclined angle θ0 can be set, for example, to 3 to 10 degrees.

For providing the backward inclined angle and supporting the tool 1 in this way, detection is made of the first component θ of an angle in the plane including the weld line direction 73, which angle is formed, for example, by the rotation axis a of the tool 1 and the normal line n of the workpieces 62aS, 62bS, and also of the second component φ of an angle in the plane orthogonal to the weld line direction 73, which angle is formed by the rotation axis a and the normal line n. The relative posture between the tool 1 and the workpieces 62a, 62b may be controlled such that the first component θ approaches the backward inclined angle θ0 and the second component φ becomes smaller, approaching to zero. In this case, the end face of the tool 1 is inclined with respect to the plane S. For this reason, control shall be based on, for example, the distance to the plane S at the rear end in the weld line direction 73 of the periphery f.

Description will be made of the case where the surfaces 62aS, 62bS of two workpieces 62a, 62b have unevenness and the case where their heights differ from each other. In this case, assuming an average plane (hereunder referred to as plane S') in the region where the tool 1 is inserted or the region including its neighbor in addition to the first region, its normal line shall be regarded as n.

This kind of plane S' can be obtained by detecting heights of the surfaces 62aS, 62bS of the workpieces, for example, at a plurality of points around the tool 1 and defining a plane fitting these points.

More concretely, the respective heights of the workpieces 62a, 62b shall be detected forward and backward in the weld line direction 73 of the tool 1.

As an example of detecting the height at 4 points, the heights of points 67a, 67b on the workpieces 62a, 62b can be detected forward of the weld line direction 73 of the tool 1, while the heights of points 67c, 67d on the workpieces 62a, 62b can be detected backward in the weld line direction 73 of the tool 1.

At this time, the points 67c, 67d preferably are at positions apart than a radius r of the tool 1 from the welding groove 63. Thereby, the height can be detected at the backward in the weld line direction 73 of the tool 1 while avoiding the processing trace of the tool 1. Therefore, the error element involved in the detection on the processing trace can be eliminated.

The points 67a, 67b preferably are at positions closer than the radius r of the tool 1 from the weld groove 63. This is because that the state of the surface at the region where the processing is actually done can be detected.

For example, in the case that the radius of the tool 1 is φ15 mm, the points 67a, 67b can be set at the regions forward by 30 mm in the weld line direction 73 from the tool 1 and remote by 8 mm from the weld groove 63, whereas the points 67c, 67d can be set at the region backward by 30 mm in the weld line direction 73 from the tool 1 and remote by 20 mm from the weld groove 63.

The plane S' can be obtained by fitting from the heights of the respective points that are detected in this manner.

It is also possible to obtain the deflection in the θ direction between the rotation axis a and the normal line n from the difference between the average of the heights detected at the points 67a, 67b and that at the points 67c, 67d and to obtain the deflection in the φ direction between the rotation axis a and the normal line n from the difference between the average of the heights detected at the points 67a, 67c and that at the points 67b, 67d.

The control of relative posture between the tool 1 and the workpieces 62a, 62b may be conducted so that the normal line n coincides with the rotation axis a similarly to the above-mentioned case and so that the relative posture becomes the backward inclined angle θ0 predetermined with respect to the normal line n.

On the other hand, the control of the depth for which the end face of the tool 1 is inserted into the workpieces 62a, 62b (insertion depth) may be conducted such that the depth for which the periphery f of the end face of the tool 1 is inserted from the plane S obtained as above becomes a predetermined value. The predetermined value concerning this depth may be decided to be, for example, 0.0 to 0.5 mm.

Further, if the profile of the surfaces 62a, 62b of the workpieces is measured forward in the weld line direction 73 of the tool 1, it is desirous to control the insertion depth based on the minimum value of the depth for which the periphery f of the end face of the tool 1 is inserted from the surfaces 62aS, 62bS of the workpieces. Thereby, the insertion depth can be controlled in accordance with the lowest region of the workpiece even if there is unevenness on the profile of the surfaces 62aS, 62bS of the workpieces.

At this time, when the tool 1 is supported with the backward inclined angle θ0, the control may be based on the minimum value in the half arc backward in the weld line direction 73 of the periphery f.

FIGS. 9 are block diagrams explaining display portions for displaying the relative positional relation between the tool and the surface of the workpieces.

Figure 9C:
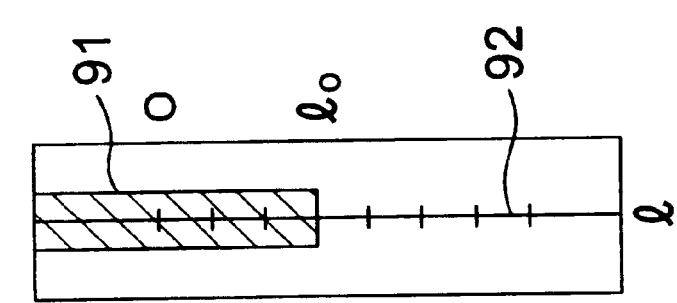
FIG. 9 are explanatory views showing a display portion for displaying a relative positional relation between the tool and the surfaces of the workpieces.
Figure 9B:
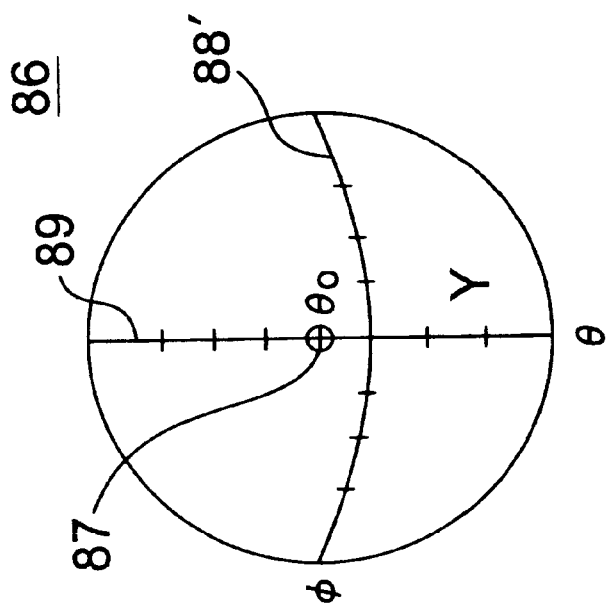
Figure 9A:
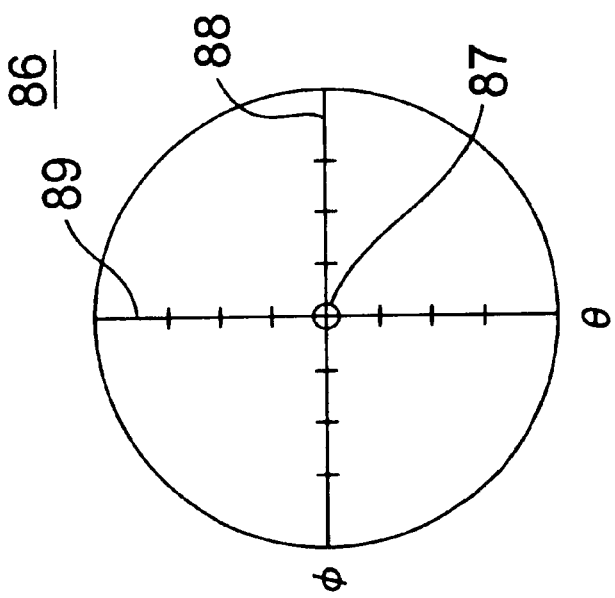

FIG. 9(a) shows a display portion for displaying the relative posture between the tool and the workpiece surface.

FIG. 9(a) indicates the relative posture between the tool and the workpiece surface in terms of the relation between a normal line of the workpiece surface and the rotation axis of the tool, and the display portion 86 has an index 87 for showing the relative deflection between the normal line of the workpiece surface and the rotation axis of the tool, a graduation 89 showing the component θ of an angle within the plane including the weld line direction, which angle is formed between the normal line of the workpiece surface and the rotation axis of the tool, and a graduation 88 showing the component φ within the plane including the direction perpendicular to the weld line direction. These graduations may be based on the state where the normal line of the workpiece surface coincides with the rotation axis of the tool as shown in FIG. 9(a), and this may be set at the center of the display region. The state shown in the figure indicates that the index 87 is positioned at the home position (the cross point between the θ axis graduation 89 and the φ axis 88) and the normal line of the workpiece surface coincides with the rotation axis of the tool. The displayed θ and φ can be obtained from the normal line n (see FIG. 8) of the averaged plane S' obtained as described above and from the rotation axis a (see FIG. 8) of the tool.

FIG. 9(b) indicates another display portion for displaying the relation between the direction in which the rotation axis of the tool should be controlled and the actual direction of the rotation axis, which has been predetermined with respect to the workpiece surface. This is the display region or portion suitable for the case where the rotation axis of the tool should be inclined backward by a predetermined backward inclination angle θ0.

The display region 86 in FIG. 9(b) comprises an index 87 for showing the relative deflection between the normal line of the workpiece surface and the rotation axis of the tool, a graduation 98 showing the component θ of an angle within the plane including the weld line direction, which angle is formed by the normal line of the workpiece surface and the rotation axis of the tool, and a graduation 88' showing the component φ within the plane including the direction perpendicular to the weld line direction. These graduations differ from the example shown in FIG. 9(a) in that the θ axis graduation 98 is offset by the predetermined backward inclination angle θ0 and that the φ axis graduation 88' is bent in a manner of the sphere meridian. Namely, this is based on the state where the normal line of the workpiece surface and the rotation axis of the tool coincide with the relative posture relatively displaced by the predetermined backward inclination angle θ0, and this can be set at the center of the display region.

FIG. 9(c) indicates still another display region for displaying the insertion depth of the periphery of the shoulder portion of the tool.

In FIG. 9(c) the display region 90 comprises a graduation 92 for showing the insertion depth and an index 91 for showing the depth for which the shoulder portion of the tool is inserted.

It is possible to achieve the display for easily recognizing the relative positional relation between the tool and the workpiece surface by displaying the relative positional relation between the tool and the workpiece surface using the display regions as mentioned above.

Therefore, it becomes easier and securer to recognize the insertion depth for which the shoulder portion of the tool is inserted into the workpiece surface, namely the standard for the operation of the relative distance between the tool rotation mechanism for supporting the tool, or for rotating and driving the tool in addition to the supporting, and the workpieces, and also to recognize the standard for the operation of the relative posture between the tool rotation mechanism and the workpieces. Therefore, it becomes possible to control these relative positional relations, suppress changes and moreover achieve the predetermined relative positional relation.

Especially, it becomes possible to display easily the way of operating respectively the components within the plane in the weld line direction out of the relative distance, the relative posture and the component orthogonal to it, that are the components of the relative positional relation.

Figure 10:
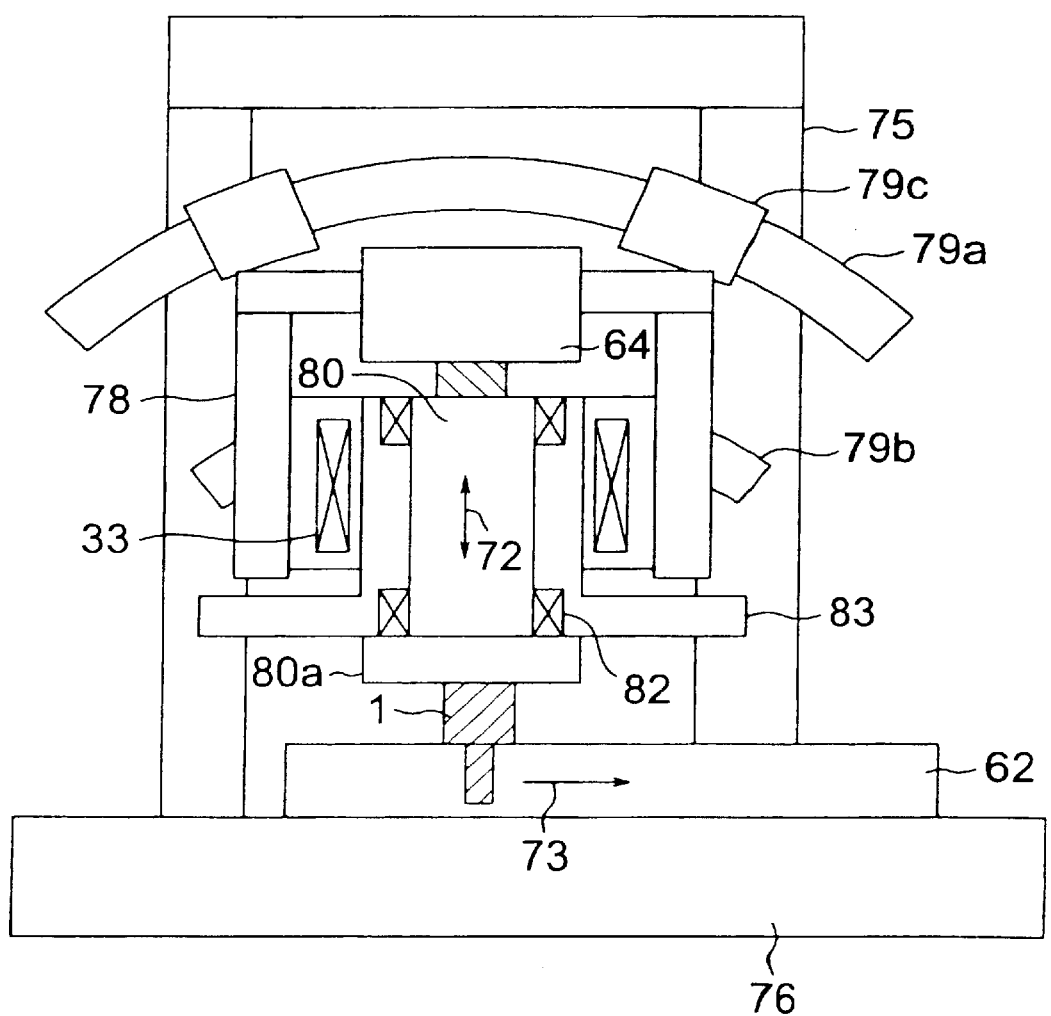
FIG. 10 is a cross sectional view showing another friction stir welding apparatus according to the invention.

FIG. 10 is a cross sectional view of a friction stir welding apparatus suitable for operating the relative posture between a tool and workpieces. In this figure, a part of a driving mechanism and a detecting section are omitted, but they may be structured in a similar manner to Embodiments 2 and 3. This friction stir welding apparatus differs from the arrangements of these embodiments in that the rotation axis of the tool 1 is supported for swinging. Hereunder, description will be made mainly of the differences.

In FIG. 10, the friction stir welding apparatus in the arrangement of this embodiment comprises the tool 1 for causing friction with the workpieces 62, a rotating shaft 80 that has a mounting member 620a for mounting the tool 1, a box 83 that has a rotation bearing 22 for rotatably supporting the rotating shaft 80, a rotation motor 4 for turning the rotating shaft 80, a bearing 33 in the vertical direction for supporting the box 83 for movement in the vertical direction, a support frame 78 for supporting the bearing 33, a bearing 79c for supporting the support frame 78 on curvature rails 79a, 79b for sliding, and a weld frame 76 for fixing and supporting the workpieces 62 and for supporting the movable frame 75 for movement in the weld line direction 73.

This friction stir welding apparatus can allow the rotation axis of the tool 1 to swing because the support frame 78 is supported by the bearing 79c while being guided by the curvature rails 79a, 79b.

The swing motion of the tool 1 can be conducted more smoothly even in the course of welding by making the curvature center of the rails 79a, 79b coincide with a shoulder portion of the tool 1.

According to this embodiment, it becomes possible to control easily and adequately the relative positional relation between the tool and the workpieces.

Therefore, even in the case that there is unevenness on workpieces and there are differences in surface level between two workpieces, it becomes possible to control the relative posture and the insertion depth of the tool and the workpieces according to these unevenness and differences.

Accordingly, the metal in a plastic fluidity state can be prevented from overflowing from the shoulder portion of the tool. It is therefore possible to prevent the occurrence of defects in the weld zone of a welded structure to improve the reliability.

Not only in straight line welding but also in the case that the surface of a weld zone is curved or inclined, welding with high reliability can be conducted.

By applying the arrangement of this embodiment, for example, to the manufacturing of railway rolling cars, it is possible to prevent the occurrence of welding defects and to thereby enhance the reliability even if welding lengths are longer, or more concretely even if welding lengths are, for example, on the order of 20 m.

[Embodiment 6]

Figure 11:
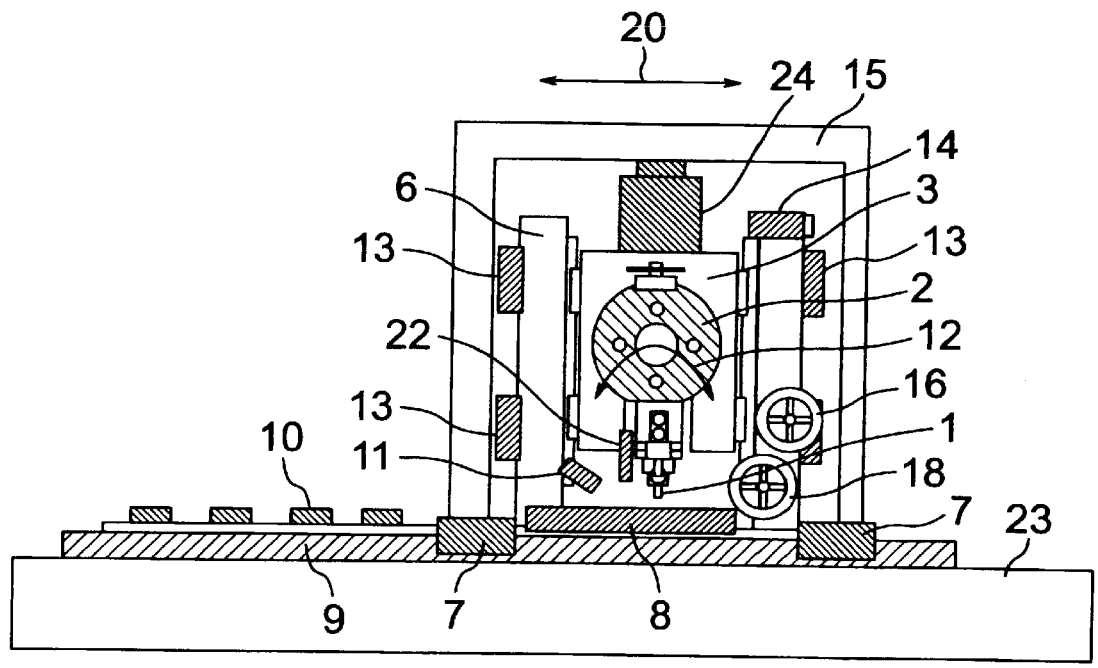
FIG. 11 is a side view of another friction stir welding apparatus of the invention.
Figure 12:
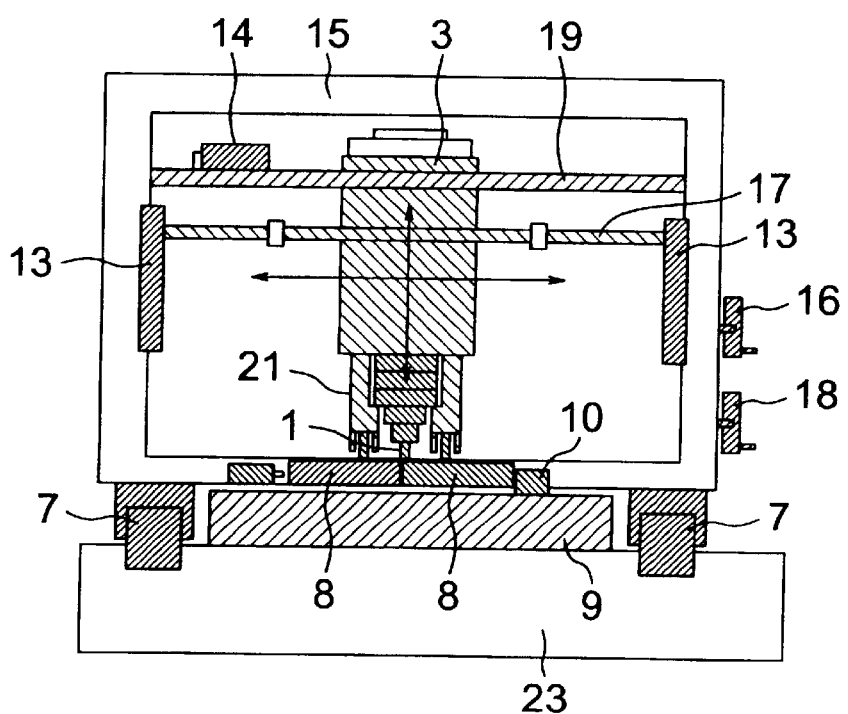
FIG. 12 is a front view of FIG. 11.

FIG. 11 is a side view showing the basic structure of another friction stir welding apparatus according to the invention for joining workpieces of Al base alloy, while FIG. 12 is a front view.

The apparatus according to this embodiment comprises a tool driving mechanism 3 equipped with a rotation and inclination angle adjusting mechanism 2 for a tool 1, a tool head 6 equipped with a vertical movement mechanism 4 and a horizontal movement mechanism 5 for the tool 1, a head movement mechanism 7 equipped with a mechanism for moving the tool head 6 in the welding direction, a frame 23 and a hold-down mechanism 10 for fixing workpieces 8, and a monitor device 11 capable of monitoring the joined state in a welding process.

(1) The driving mechanism 3 for the tool 1 comprises a drive motor 24 for rotating the tool and the inclination angle adjusting mechanism 2. The tool is turned directly by the motor or indirectly via gears or a belt. The rotation of the tool can be adjusted by an inverter control device connected with the electric motor, while its revolution number can be adjusted arbitrarily between 500 to 3,000 rpm. Further, the inverter control device can automatically control the change of rotation direction.

An inclination angle 12 of the tool can be adjusted manually by an index shaft and plate. Moreover, this angle may also be automatically adjusted via an electric motor. The inclination angle 12 can be arbitrarily adjusted in the range of 0 to 10 degrees.

(2) The tool head 6 comprises a tool vertical direction drive motor 13 for moving the tool in the vertical direction 4 and a tool longitudinal drive motor 14 for moving the tool in the horizontal direction 4, and the tool head 6 is secured to a gantry type frame. The movement of the tool in the vertical direction 4 can be done via a manual handle 16 or the tool vertical direction drive motor 13 and a screw jack 17. The movement of the tool in the horizontal direction can be done via a manual handle 18 or the tool horizontal direction drive motor 14 and a ball screw 19.

(3) The tool head mechanism 6 is secured to the gantry type frame 15 and is moved by the tool head driving mechanism 7 which moves in the welding direction 20 together with the frame. The frame can be moved manually or via an electric motor and gears. Namely, welding can be done when the gantry type frame 15 moves in the welding direction 20 with the tool being rotated. The movement speed can be arbitrarily adjusted between 100 to 2,000 mm/min.

(4) The frame 23 and the hold-down mechanism 10 for securing the workpieces 8 are equipped with a mechanism for fixing and restraining the workpieces 8 from a surface direction or lateral side direction. The workpieces can be restrained manually with bolts. They may be held automatically by means of hydraulic pressure, water pressure or compressed air. The restraint by means of hydraulic pressure and compressed air can be done with the maximum value of 3,000 kgf.

On the other hand, separately from the hold-down mechanism arranged on the fixing frame 23, another restraint mechanism 21 is also mounted in the coaxial direction with the tool 1. If the workpieces 8 are directly loaded on the frame 23 and joined by the tool 1, the frame 23 is damaged by the tool 1, so a fixing table 9 is provided for preventing such damage.

(5) The device 11 for monitoring in the course of welding can optically monitor the joint and its vicinity in the course of welding through a CCD camera. Further, the tool depth direction from the surface of the workpieces can be monitored with a laser displacement gauge 22 or a dial gauge.

The elements 1 to 22 described above can all be mounted on the frame 23 via the gantry type frame.

Even the workpieces of long size and wide width can be joined with stability by the friction stir welding apparatus comprising the above mechanisms 1 to 23. Further, because the inclination angle and the rotation direction of the tool are freely adjustable, welding can be done in both a coming path and a going path.

Figure 13:
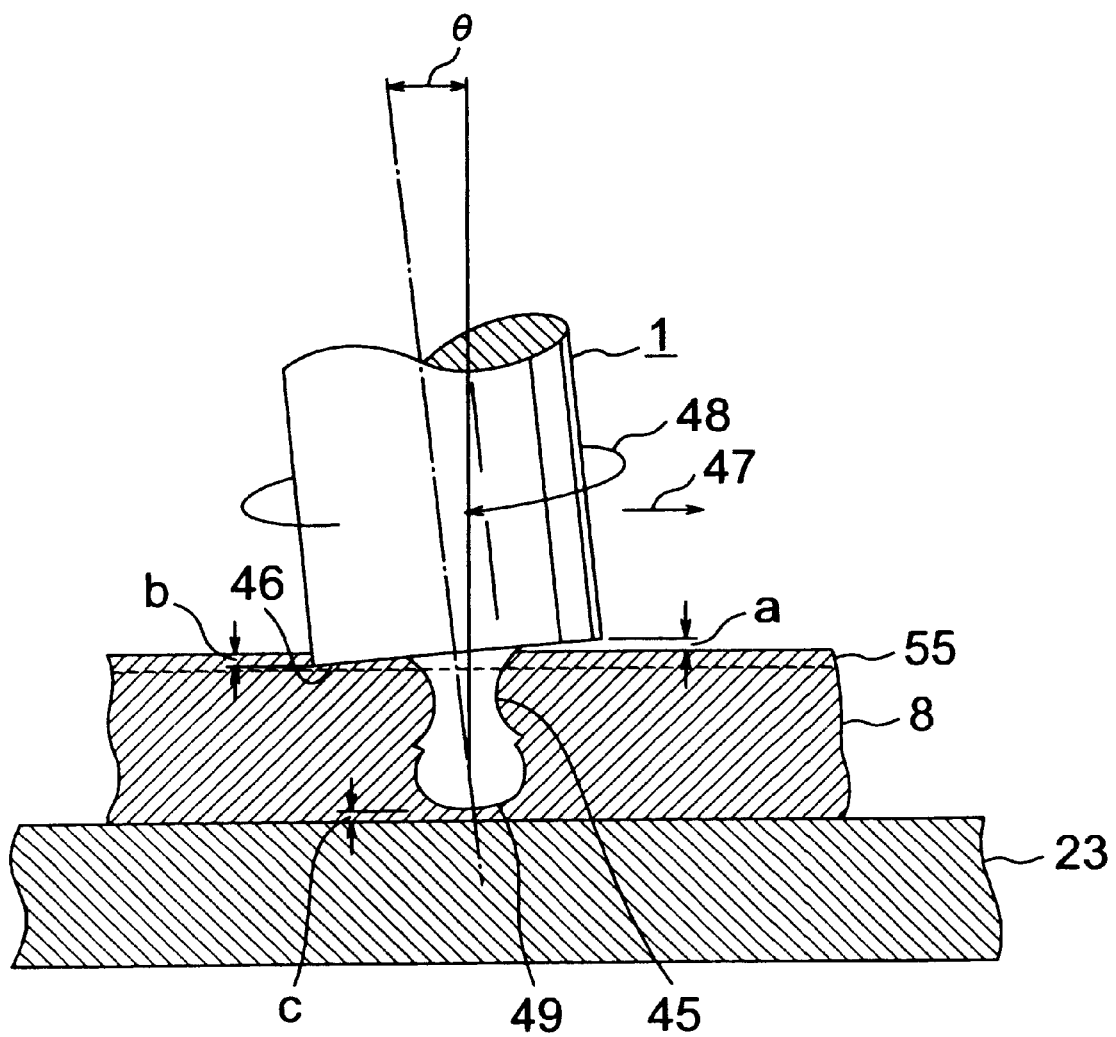
FIG. 13 is a cross sectional view showing a relation between a tool and workpieces in the friction stir welding of the invention.
Figure 23:
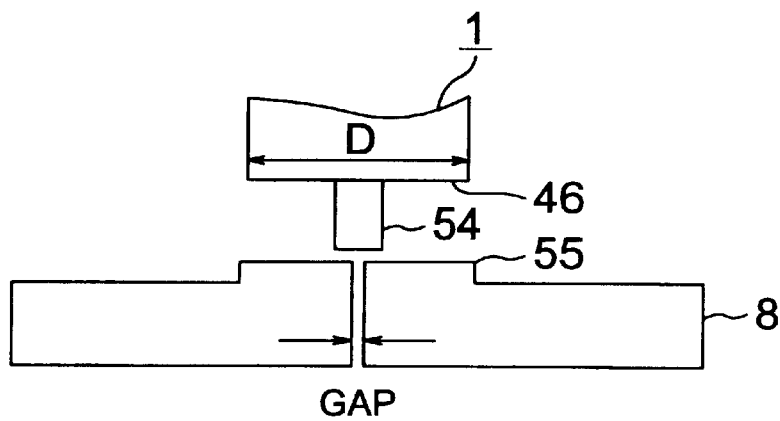
FIG. 23 is a cross sectional view showing a coupling structure according to the invention.

FIG. 13 is a cross sectional view showing the insertion of the tool 1 into the workpieces while the tool being rotated to join them according to this embodiment. In this embodiment, a shoulder portion 46 of the tool 1 is raised on the right side with respect to the welding direction 47, and a gap a is provided from the surface of the workpieces 8 at the leading part of the shoulder portion 46 so that the workpieces are not cut by the shoulder portion, and the tool 1 is pushed into the workpieces by a depth b at its trailing part. A protrusion 55 similar to that shown in FIG. 23 is provided in the joining region of the workpieces 8.

The depths a and b are both within 1 mm, preferably from 0.2 to 0.6 mm. These depths become larger when the workpieces are thick, because the thread portion and the shoulder diameter of the tool are large, and the allowable range has a proportional relation.

The tool 1 is inclined by θ with respect to the surface of the workpieces 8, and this angle is within 10 degrees, preferably from 3 to 7 degrees. It is preferable to set the angle larger depending on the thickness of the joint of the workpieces 8.

Furthermore, a distance c between the tool 1 and the frame 23 is necessary for preventing the direct contact of the tool 1 with the. frame 23 and for preventing damage of both of them. However, when that distance c is too large, joining of the workpieces 8 at their rear sides becomes insufficient, and in order to achieve sufficient joining, it is set to be less than 0.4 mm or preferably to 0.05 to 0.2 mm though it depends on the thickness of the workpieces 8. Thereby, good joining can be achieved.

The tool 1 has the thread portion 49 and the shoulder 46 which are to be inserted into the workpieces 8, and a thread is formed on the tip of thread portion 49, and in this embodiment, a neck region 45 is smaller in diameter than the thread portion so that a sharp joint with a narrow width may be formed. The maximum diameter of the thread portion is preferably from 1.1 to 1.5 times the neck region 45.

[Embodiment 7]

Figure 14:
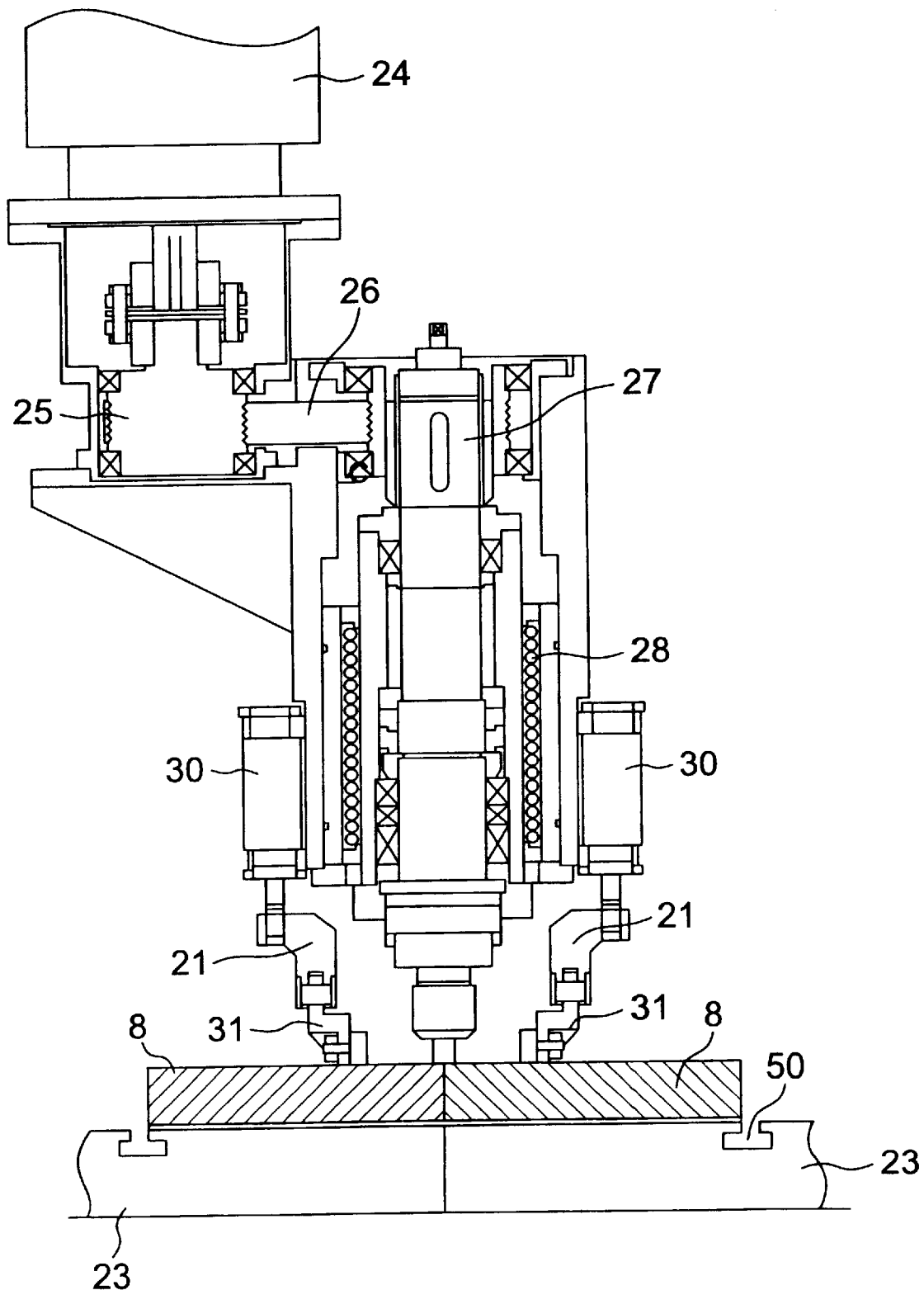
FIG. 14 is a cross sectional view of a tool and hold-down means of the invention.

FIG. 14 shows a driving mechanism for a tool 1 and a hold-down mechanism 21 for workpieces 8, which is made of Al base alloy and arranged coaxially with the tool 1. Driving for rotation and vertical movement of the tool 1 is transmitted to a rotation axis 27 of the tool via gears 25, 26 from a rotation motor 24. The rotation axis 27 moves also in the vertical direction while being turned via a spindle device 28. A frame 23 is divided into two halves on the right and left sides, and the halves are fixed with bolts so that they do not separate from each other. Grooves 50 for fixing the workpieces 8 are provided in the frame 23.

On the other hand, the workpieces 8 are arranged on the frame 23 for fixing the workpieces, and restrain the workpieces 8 from above with the hold-down mechanism 21 that is provided coaxially with the tool 1. The hold-down mechanism 21 restrains the workpieces from above via hold-down rollers 31 by means of hydraulic cylinders 30. The hold-down rollers 31 have rotation mechanisms. The hold-down mechanism 21 moves in the vertical direction independently of the tool 1. When conducting welding, first, the workpieces are held down at their surfaces by the hold-down mechanism 21. Then, the tool 1 is inserted into the workpieces 8 by a required depth while it is turning. Welding of the workpieces 8 is thus started upon movement of a gantry type frame 15 while the tool 1 is rotating under the above state. Even the workpieces of long size and wide width can be welded stably by the above-described apparatus.

Also in this embodiment, the relation between the tool 1 and the workpieces 8 is identical to that in Embodiment 1.

[Embodiment 8]

Figure 15:
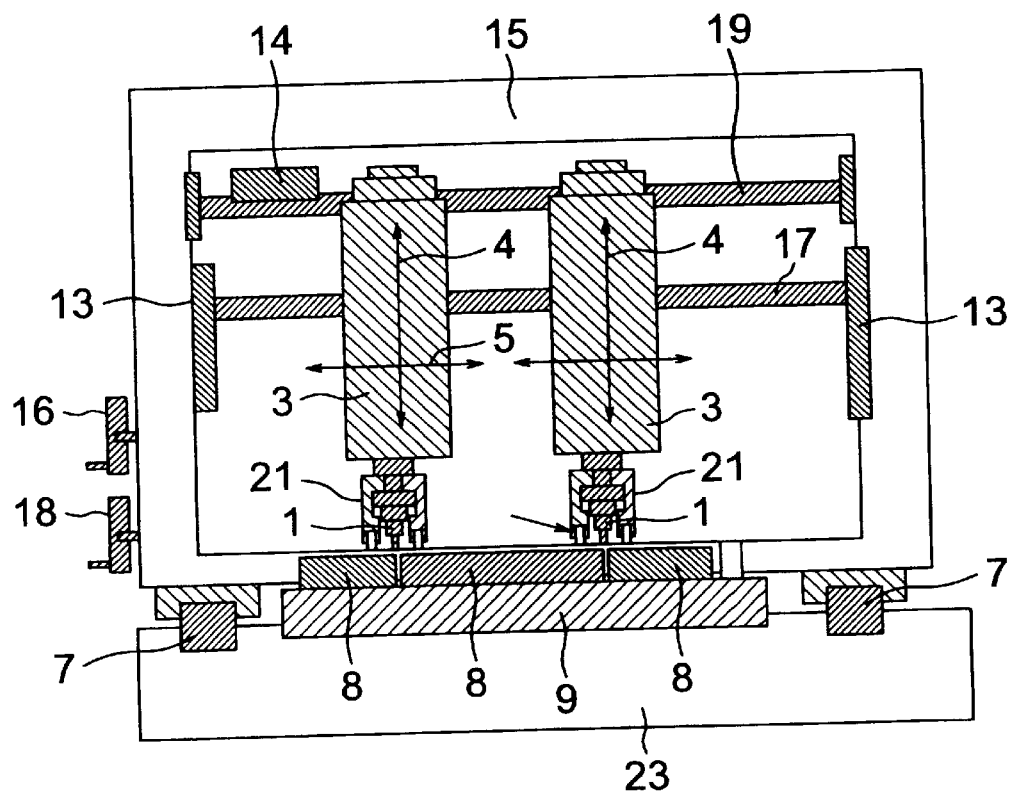
FIG. 15 is a cross sectional view of another friction stir welding apparatus of the invention where a plurality of tools are mounted.

FIG. 15 is a front view indicating the basic structure of another friction stir welding apparatus wherein a plurality of tools and a driving mechanism for them are provided on the single friction stir welding apparatus. As shown in FIG. 15, the plurality of tools and the driving mechanism are arranged on the apparatus, and the tools can be driven for rotation, vertical movement, horizontal movement and angle independently of each other or collectively. The driving mechanism and the joining state according to the apparatus are essentially identical to those of Embodiment 1, and therefore explanation of them will be omitted. The apparatus can weld a plurality of joining regions simultaneously, and the higher efficiency of joining work can be realized.

[Embodiment 9]

Figure 16:
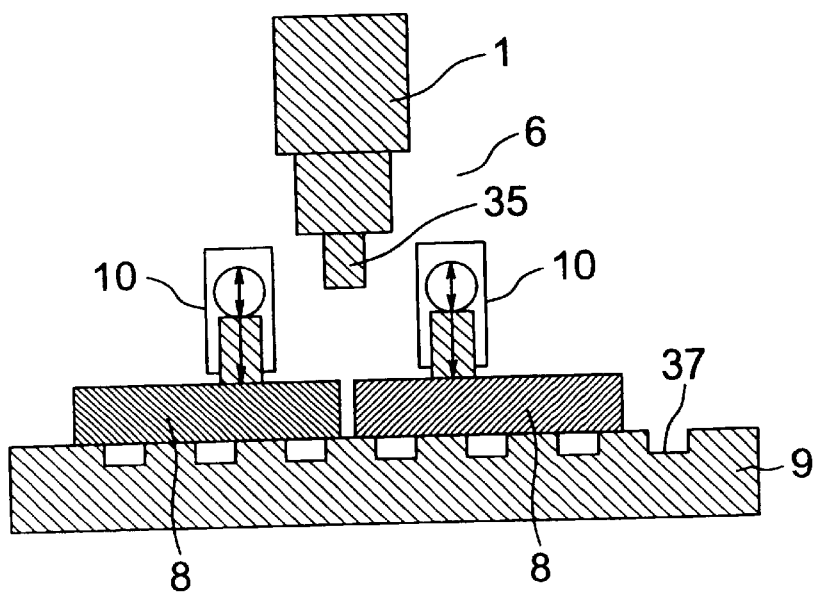
FIG. 16 is a cross sectional view showing hold-down means and a holding method according to the invention.

FIG. 16 is an explanatory view of a method for holding workpieces. As shown in FIG. 16, a tool consists of a thin pin portion 35 at its tip and a shoulder portion 36 thicker than the pin portion. The workpieces 8 are extruded shapes made of JIS code 6N01 material in the size of 5 mm thick, 400 mm wide and 5,000 mm long. A fixing table 9 has a groove 37 for fixing the workpieces in its surface contacting the workpieces 8. With this groove 37, even if the fixing position of workpieces changes, the hold-down mechanism can be positioned accordingly, so the workpieces can be restrained easily. Hereunder, restraint of the workpieces will be explained.

First, as shown in FIG. 16, the workpieces 8 are laid on the fixing table 9. Then, the workpieces 8 are held with a load of 1,000 kgf maximum in the downward direction from the both sides of the tool 1 by the hold-down mechanism of hydraulic driving. The pin portion 35 of the tool is inserted into the workpieces 8 by a predetermined depth while the tool 1 is rotated. The tool moves in the direction along the joining line while it is turned, and welding is thus started. The revolution number of the tool in this embodiment is 1,000 rpm, and the welding speed is 500 mm/min.

In this embodiment, restraint is made only from the surface direction of the workpieces, but the purpose can be achieved by holding the workpieces from both the right and left directions. Further, the purpose may also be attained by restraining the workpieces from either the surface direction or the lateral side direction. The hold-down mechanism may be of an integral structure having a length equal to the workpieces or of a split structure that is divided into plural pieces. Because the workpieces can be held stably by the hold-down mechanism, stable joining becomes feasible, and the quality of joining regions can also be enhanced. The workpieces that are joined according to the welding apparatus and method described above may be employed as members for railway rolling stock.

[Embodiment 10]

Figure 17:
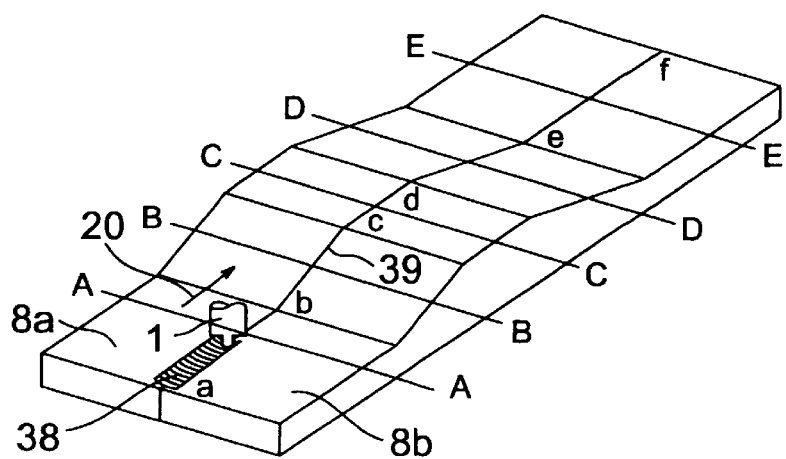
FIG. 17 is a perspective view of workpieces for the invention where a curved concave region is present on a part of workpieces.
Figure 18:
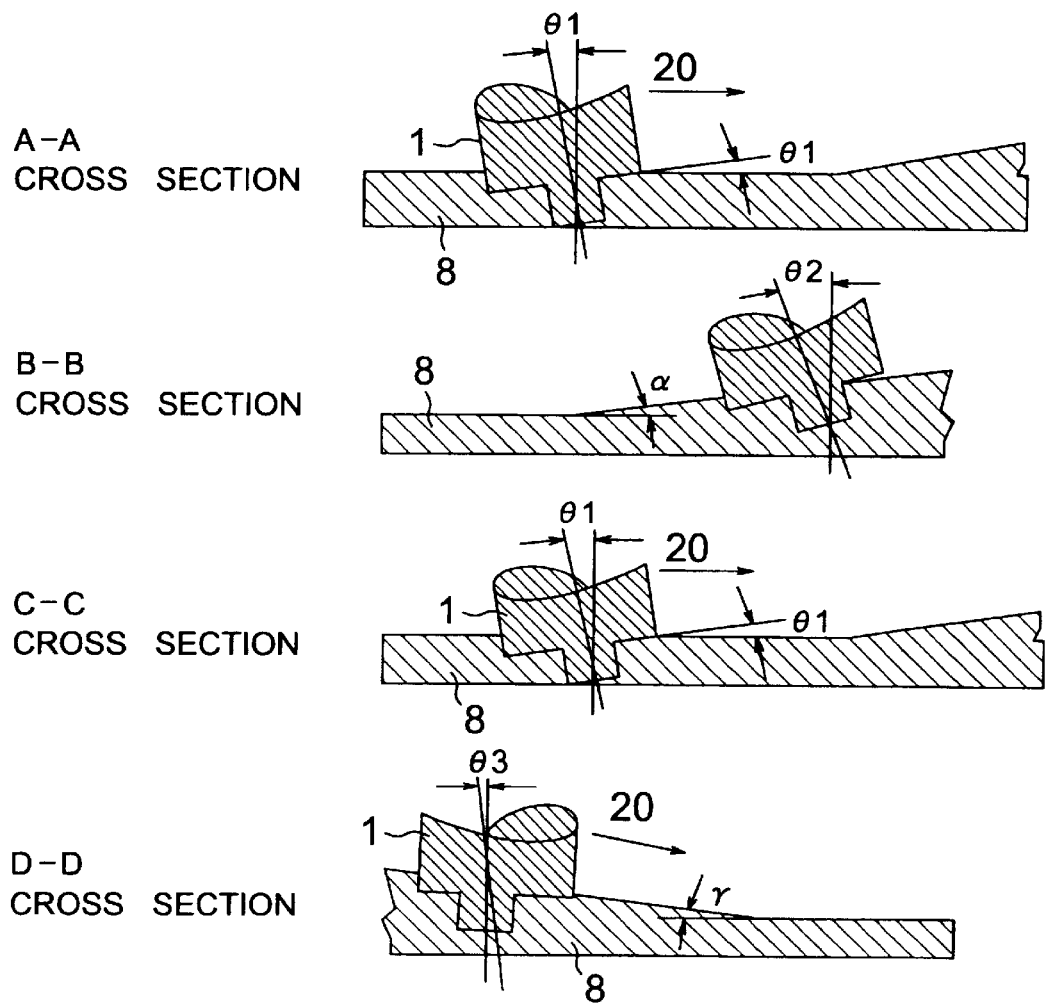
FIG. 18 are a cross sectional views of respective joint portions of FIG. 17.

FIG. 17 is a perspective view of an embodiment illustrating a method for welding workpieces 8 whose thickness varies locally and which have inclinations partially. FIG. 18 shows the inclination angles of a tool in respective joining regions of FIG. 17. The workpieces are the aluminum alloy of JIS code 5052 of 3 m long. The thickness of the thin portions of the workpieces is 4 mm, their thick portion is 7 mm, their width is 200 mm and the inclination angles are 10 degrees in all the inclinations.

As shown in FIG. 17 and FIG. 18, the inclination angle of the tool is adjusted to be always constant with respect to the workpiece surface. In this embodiment, the inclination angle of the tool is adjusted as follows.

(1) A tool angle θ1 in the region where no inclination is on the workpieces as is between a–b of FIG. 17 is adjusted to 3 degrees in the opposite direction to the welding direction 20 as shown in a A—A section of FIG. 18 and a joining region 38 is formed.

(2) Simultaneously when the tool reaches a point b of FIG. 17, an inclination angle θ2 of the tool is adjusted to be larger by 3 degrees than the inclination angle α of the workpieces 8 as shown in a B—B section of FIG. 18, and the region between b–c is welded with the tool of this angle.

(3) Simultaneously when the tool reaches the flat region at a point c, the inclination angle of the tool is adjusted again to the same angle θ1 as is in the A—A section as shown in a C—C section of FIG. 18, and the region between c–d is welded with the tool of this angle.

(4) Simultaneously when the tool reaches a point d, the tool is adjusted to an angle θ3 that is smaller by 3 degrees than the inclination angle γ of the workpieces, and the region between d–e is joined with the tool of this angle.

(5) When the tool reaches a point e, the tool angle is again adjusted to the same angle as is in the A—A section.

By adjusting sequentially the inclination angle of the tool in accordance with a change in the inclination angle of the workpieces as described above, all the joining lines 39 can be made continuously and stably even when the thickness of the workpieces varies.

The adjustment of the inclination angle of the tool involved in changes of the inclination angle of the workpieces is feasible by calculating the time from the distance from a welding start point to an inclined point and from a welding speed, and by making the control device recognize the time for respective adjustment starting points. That is, when the welding speed is constant, the time until the inclination starting point of the workpieces can be calculated from the joining length, and the inclination angle of the tool can be controlled on the basis of that time. Stable and efficient welding can be achieved by the welding apparatus and method described above even in case of workpieces where an inclination exists on a part of the workpiece surface. The workpieces that are joined by the welding apparatus and method may be used as automobile members.

[Embodiment 11]

Figure 19:
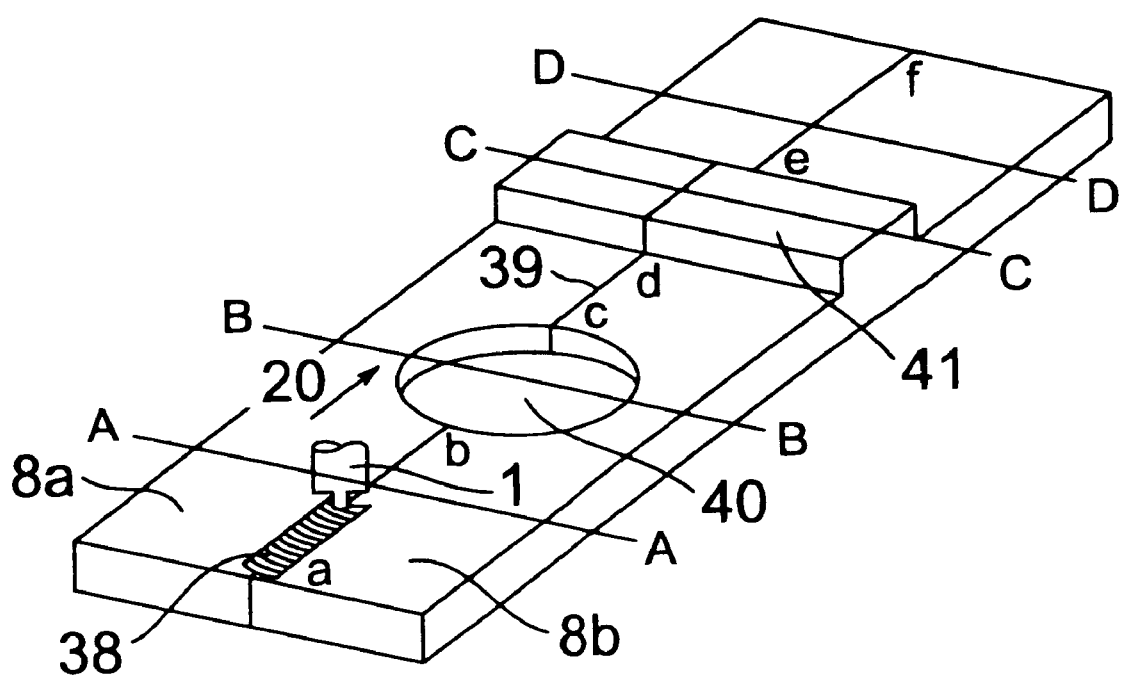
FIG. 19 is a perspective view of workpieces for the invention where uneven portions are present on a part of the workpieces.

FIG. 19 is a perspective view showing an embodiment of a welding method in the case that there is a difference of height, or there is unevenness on part of the surfaces of workpieces. FIG. 19 shows the case where there are a bored region 40 and a convex region 41 partially on the workpieces. The workpieces 8 are of an aluminum alloy of JIS code A6061. The thickness between a–d of the workpieces is 5 mm, the thickness between d–e is 8 mm, the width is 400 mm and the total length is 20 m. The bored region 40 between b–c existing partially on the workpieces requires no welding. The convex region 40 requires joining. The welding is conducted in the following sequence.

(1) In an A—A region between a–b of FIG. 19 where a usual joining line 39 exists, the pin region 35 of the tool 1 is inserted from the workpiece surface to a pre-adjusted constant depth, and a joining region 38 is formed.

(2) Just before the tool reaches the B—B bored region 40 between b–c, the tool is pulled out of the workpieces and rises in the upward direction. At this time, movement of the tool is stopped once.

Then, the tool starts moving again in the welding direction. However, in the bored region 40, the tool moves in the state of being pulled out of the workpieces 8.

(3) When the tool reaches a point c, movement of the tool is stopped again, and it is inserted again into the workpieces while being rotated, and joining between c–d is started similarly to the A—A region.

(4) The movement of the tool is stopped just before it reaches the convex region 41 at a point d, and the tool is pulled out of the workpieces again. At the same time, calculating the relative positional relation between the surface height of the convex region 41 and the height of the tool, the tool is again inserted by the pre-designated depth into the convex region 41 shown in a C—C region, and the portions between d–e are joined.

(5) Then, the movement of the tool is stopped just before it reaches a point e, and the tool is again pulled out of the workpieces.

(6) In a smooth D—D region between e–f, the pin region 35 of the tool 1 is again inserted by the preset depth into the workpieces 8 and carries out the joining.

The start of adjusting the insertion depth of the tool involved in changes of unevenness of the surfaces of the workpieces is possible by calculating the distance from the welding start point to each irregularity point and the time from the welding speed, and making the time of each adjustment start point recognize to the control device. Namely, if the welding speed is constant, as the time required to reach each irregularity point of workpieces can be calculated from the joining length, the insertion depth of the tool can be controlled, based on that time. Stable and efficient joining is possible by the welding apparatus and method even with workpieces where unevenness exists on a part of the surfaces of them. The workpieces according to the apparatus and method described above may be used as members for railway rolling stock.

[Embodiment 12]

Figure 20:
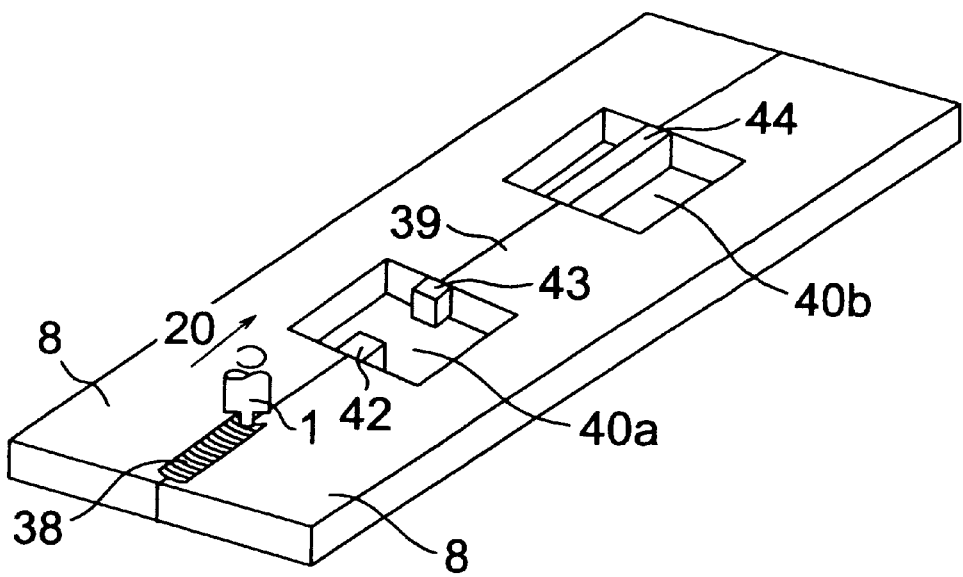
FIG. 20 is a perspective view of workpieces for the invention where uneven portions are present on a part of the workpieces.

FIG. 20 shows the case where dummy plates 42, 43 are provided in a bored 40a existing on the welding line, and welding is stopped this dummy plate 42 and started at the dummy plate 43. Namely, in welding, defects tend to occur at the start point and the stop point of welding in particular. For this reason, the arrangement of this embodiment is such that defects at the start point and the stop point of welding are caused to occur in the dummy plates 42, 43. The dummy plates are mechanically deleted after the welding.

On the other hand, a dummy plate 44 of the same length as is in the above bored region is provided in another bored region 40b. Namely, workpieces can be continuously joined without stopping welding at the bored region 40b by effecting welding on the dummy plate 44. The dummy plate is mechanically deleted after the welding.

[Embodiment 13]

Figure 21:
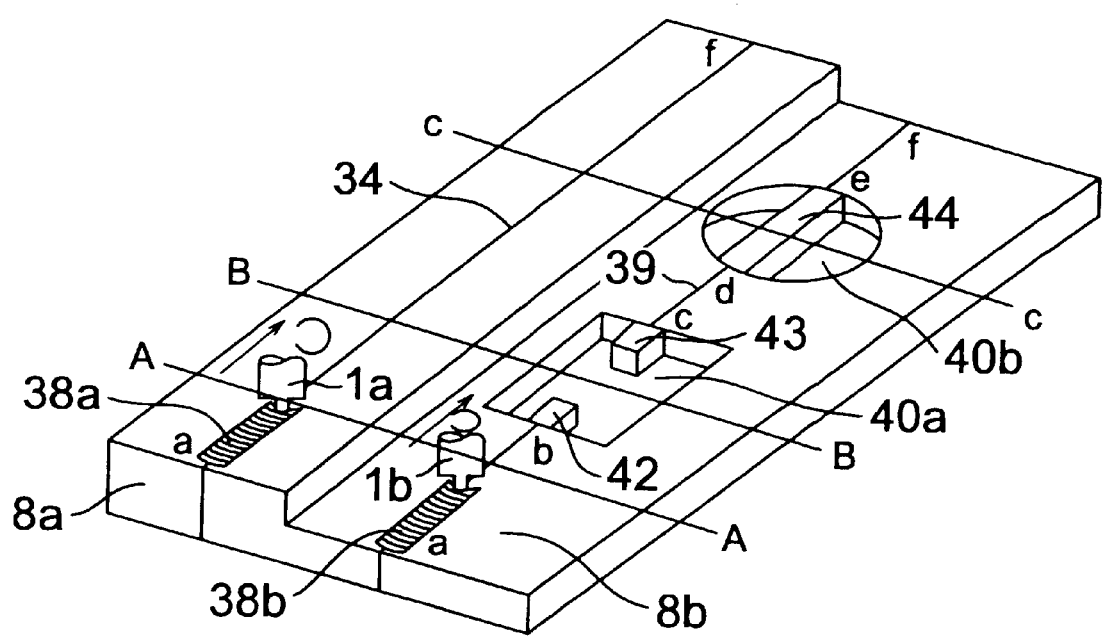
FIG. 21 is a perspective view showing a joining method with a plurality of tools according to the invention.

FIG. 21 shows a welding method using a friction stir welding apparatus, in which two tools and a driving mechanism for them are equipped on the single friction stir welding apparatus. Workpieces 8 are of JIS code 6N01 aluminum alloy.

The thickness of one workpiece 8a is 6 mm and differs from the thickness 4 mm of another workpiece 8b. Therefore the lengths of pin portions of the two tools differ accordingly to the lengths of the workpieces. A joining line 39 of the one workpiece 8a is continuous from the start point of welding to the welding end point. The other workpiece 8b has bored regions 40a, 40b on its joining line 39, and the bored regions require no welding. Namely, the embodiment relates to the friction stir welding method for simultaneously joining the workpieces which are different in thickness and have a continuous joining line and a discontinuous joining line. The welding method of the embodiment will be described below.

(1) In a region between a–b where usual joining lines exist as shown in FIG. 21, the pin portions of the tools 8a, 8b are inserted to a preset depth from the surfaces of the workpieces, welding of them is started at the same time, and joint portions 38a, 38b are formed.

(2) Upon the tool 8b reaches a dummy plate 42 in the bored region 40a, the movement of the tools 8a, 8b is stopped, and the two tools are raised upward automatically to stop the welding.

(3) Then, the two tools 8a, 8b are moved back for a distance of about 20 mm in the opposite direction to the welding direction. Defects would occur at the positions where welding has been stopped and the tools have been raised. Therefore, for re-joining these defective regions to prevent defects, the tools are slightly retracted back to the portions that have already been welded, and the tools are inserted again for starting the joining from the retracted positions. Thereby, the defects (holes), which have already occurred, can be filled up and becomes good joints.

(4) As described above, the tool 8a is re-inserted into the workpieces from the retracted position to start welding. The other tool 8b, however, moves in the state that it has been pulled out of the surface of the workpieces because of the bored region 40a. During this process, the tool 8a performs welding.

(5) When the tool 8b reaches a dummy plate 43 at a point c, the movement of the tools 8a, 8b are stopped again, and the two tools are pulled out of the workpieces 8.

(6) Similarly to the above step, the tools are retreated by about 20 mm from the positions where they have been pulled out, then the tools 8a, 8b are inserted into the workpieces again, and they perform welding while rotating and moving. Since the bored region 40b of FIG. 13 is provided with the continuous dummy plate 44, the tool 8b can effect continuous welding without ceasing the welding. The workpieces that are joined by the apparatus and method may be used as members for rolling stock.

[Embodiment 14]

Figure 22:
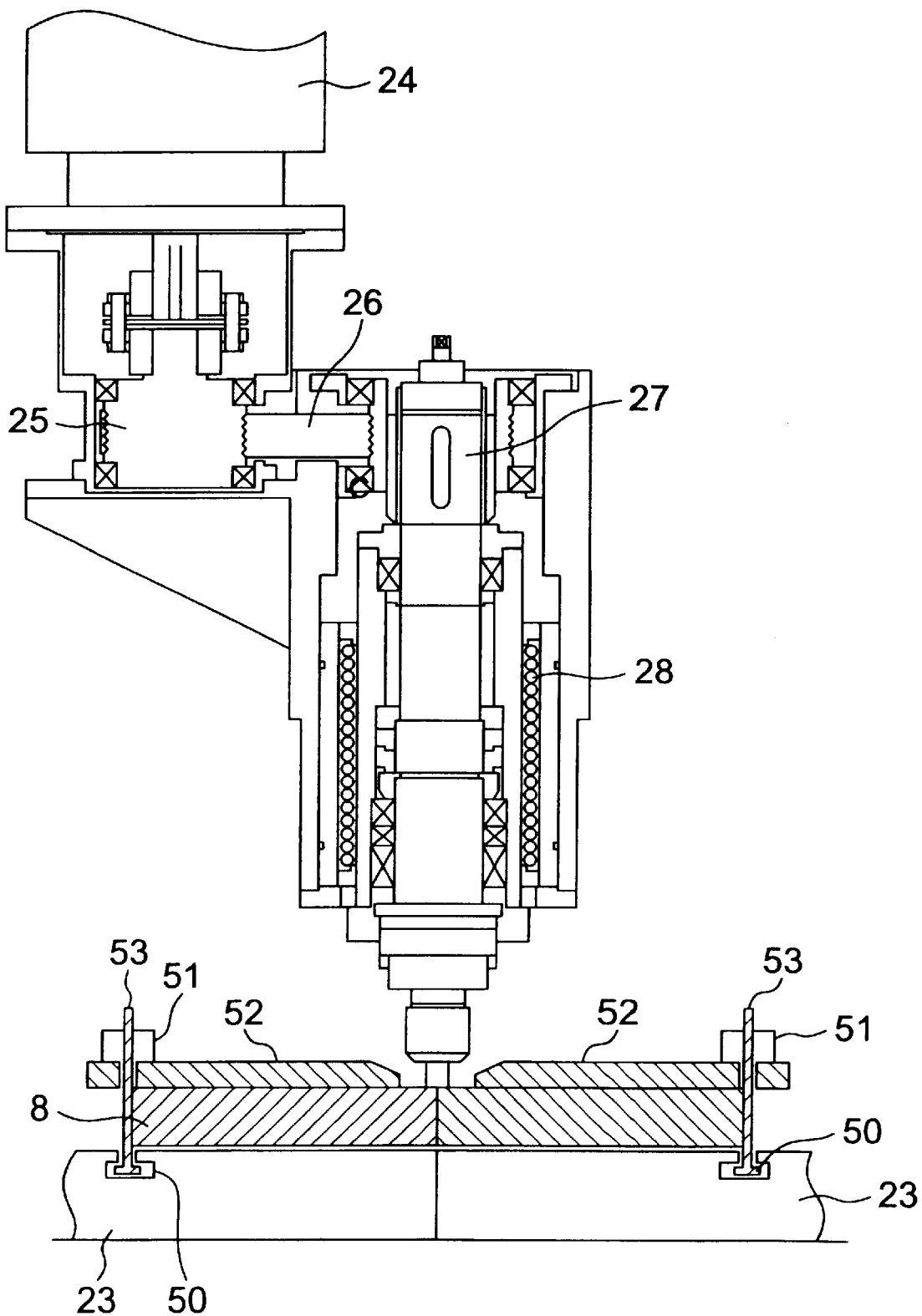
FIG. 22 is a cross sectional view showing a tool and hold-down means according to the invention.

FIG. 22 is a cross sectional view of another friction stir welding apparatus according to the invention. This embodiment has a structure wherein, instead of the hydraulic cylinder 30, the hold-down mechanism 21 and the rollers 31 provided in Embodiment 2, fixing of workpieces 8 is done with fixing members 52 which are secured to grooves 50 in a frame 23 by means of bolts 53 and nuts 52. Also in this embodiment, welding is performed similarly to Embodiment 1, and joining with a good joint on the rear side and with less burrs on the front surface can be obtained.

[Embodiment 15]

FIG. 23 is a cross sectional view showing a joint structure with an I-shape groove for 4 mm thickness plates of JIS code 6N01 Al base alloy, which is formed by an apparatus according to Embodiment 6 of the invention. Members 8 to be joined have a flat protrusion 55 provided at their joining region, and a pin 54 having a thread on its entirety is inserted into the joining region to effect friction stir welding. The tool 1 is tilted similarly to Embodiment 6. The shoulder portion 46 is pushed into the protrusion 55 to form a concave in that area, and a corrugated joint is formed. The width of the protrusion is preferably equal to or slightly larger than the diameter of the shoulder portion 46, but it may be slightly smaller than the diameter. It is preferably within ±2 mm. A gap of the joining region is preferably zero.

Figure 24:
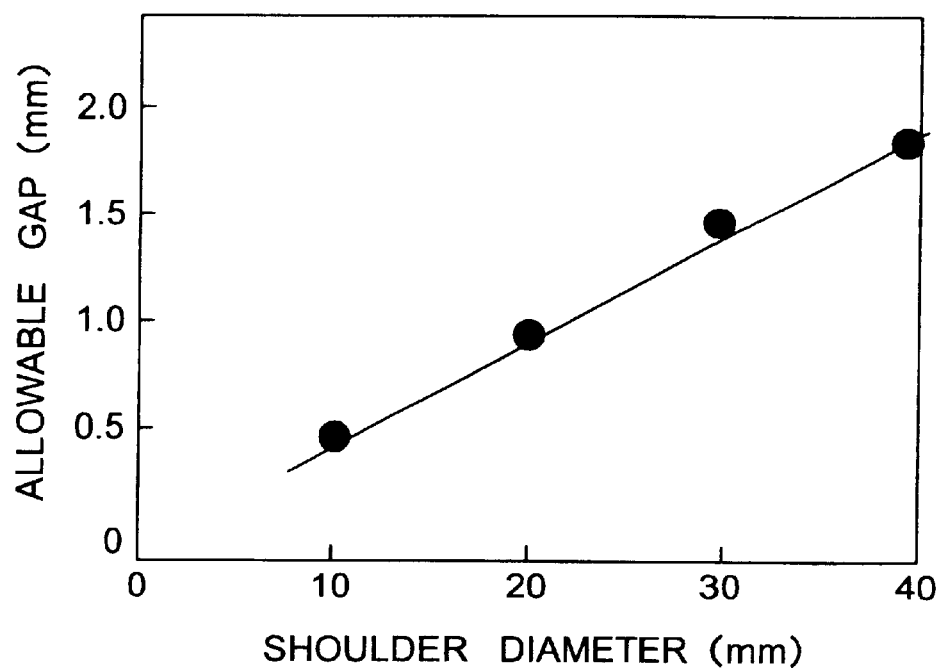
FIG. 24 is a diagram showing a relation between an allowable gap and a shoulder diameter.

FIG. 24 is a diagram showing the relation between the allowable gap width at the joint and the shoulder diameter. As shown in the figure, the allowable gap width and the shoulder diameter are shown by the straight line connecting 2 points of 10 mm with 0.5 mm and 40 mm with 1.8 mm. Therefore, excellent joining can be obtained when the allowable gap is set to a side lower than this line.

Figure 25:
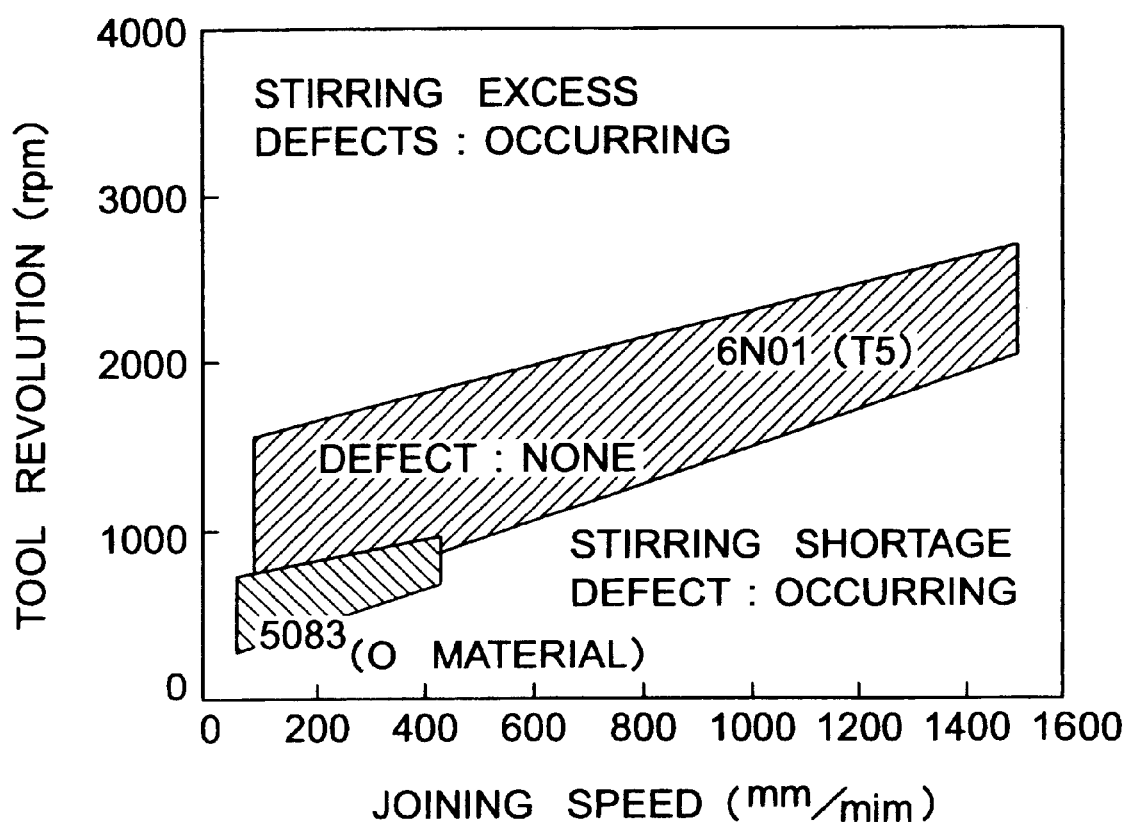
FIG. 25 is a diagram showing a relation between a revolution number of the tool and a joining speed.

FIG. 25 is a diagram showing the tool speed (rpm) and the welding speed (mm/min) concerning 5 mm thickness plates of JIS code 6N01 and 5083 of Al base alloy. For performing the joining without defects with 6N01 material, welding can be conducted within the range that is defined by points (520 rpm, 85 mm/min), (1,620 rpm, 85 mm/min), (2,680 rpm, 1,500 mm/min) and (2,030 rpm, 1,500 mm/min), and in case of 5083 material, welding can be conducted within the range that is defined by points (330 rpm, 50 mm/min), (800 rpm, 50 mm/min), (1,000 rpm, 425 mm/min) and (730 rpm, 425 mm/min).

What is claimed is:

1. A friction stir welding apparatus, comprising:
a tool having a tip portion and a shoulder portion adjoining the tip portion;
a tool rotation mechanism for rotating the tool;
a tool moving mechanism for moving the tool in a direction of progressing welding;
a tool vertical driving mechanism for pushing the tool on workpieces and pulling the tool out of the workpieces;
a detector for detecting a distance to surfaces of the workpieces;
a signal processing device for comparing the distance from the detector to the workpiece surfaces, detected by the detector during welding, with a reference value and calculating a difference between the detected distance and the reference value; and
a control device for controlling the tool vertical driving mechanism in accordance with the difference obtained by the signal processing device.

2. The apparatus according to claim 1, wherein said detector comprises a laser displacement gauge.

3. The apparatus according to claim 1, wherein said signal processing device stores, as the reference value, a distance from the detector to the workpiece surfaces detected by the detector when the tool has been inserted into the workpieces to a specified depth for starting welding and compares the thus stored reference value with the distance detected by the detector during welding to calculate the difference between the reference value and the distance detected during welding.

4. The apparatus according to claim 1, wherein said signal processing device compares the distance from the detector to the workpiece surfaces, detected by the detector during welding, with the reference value which has been set beforehand.

5. The apparatus according to claim 1, wherein said control device gives the tool vertical driving device a command for vertically moving the tool such that the difference calculated by the signal processing device becomes zero.

6. The apparatus according to claim 1, wherein said detector is disposed ahead of the tool with respect to the welding progressing direction.

7. The apparatus according to claim 6, wherein the detector is at a height above an end of the tip portion of the tool, and moves with the tool.

8. The apparatus according to claim 1, further comprising a device for adjusting an inclination angle of the tool when the tool is pushed on the workpieces.

9. The apparatus according to claim 1, wherein said tool vertical driving mechanism pushes the tool, including the tip portion and the shoulder portion adjoining the tip portion, on the workpieces.

10. A friction stir welding apparatus, comprising:

a tool having a shoulder portion;

a tool rotation mechanism for rotating the tool;

a supporting mechanism for supporting the tool rotation mechanism and workpieces so that a relative positional relation between the tool and surfaces of the workpieces, in a direction from the tool to the surfaces of the workpieces, is changeable;

a detector for detecting the relative positional relation between the tool and the surfaces of the workpieces, in said direction; and a control section for controlling movement of the supporting mechanism so that the relative positional relation, in said direction, detected by said detector, becomes close to a predetermined relative positional relation.

11. The apparatus according to claim 10, further comprising a device for adjusting an inclination angle of the tool relative to the surfaces of the workpieces.

12. The apparatus according to claim 10, wherein said control section controls movement of said tool in said direction so that the relative positional relation of said shoulder and the surfaces of the workpieces is close to the predetermined relative positional relation.

\* \* \* \* \*